United States Patent
Awadh et al.

(10) Patent No.: US 11,306,164 B2
(45) Date of Patent: Apr. 19, 2022

(54) WATER PURIFICATION MATERIAL FOR PETROCHEMICALS

(71) Applicant: King Fahd University of Petroleum and Minerals, Dhahran (SA)

(72) Inventors: Tawfik Abdo Saleh Awadh, Dhahran (SA); Nadeem Baig, Dhahran (SA)

(73) Assignee: King Fahd University of Petroleum and Minerals, Dhahran (SA)

(*) Notice: Subject to any disclaimer, the term of this patent is extended or adjusted under 35 U.S.C. 154(b) by 444 days.

(21) Appl. No.: 16/373,041

(22) Filed: Apr. 2, 2019

(65) Prior Publication Data
US 2020/0317831 A1    Oct. 8, 2020

(51) Int. Cl.
*B01J 20/00*    (2006.01)
*C08F 12/08*    (2006.01)
(Continued)

(52) U.S. Cl.
CPC .............. *C08F 12/08* (2013.01); *B01J 20/205* (2013.01); *B01J 20/262* (2013.01); *C02F 1/288* (2013.01);
(Continued)

(58) Field of Classification Search
CPC ....... C08J 5/00; C08J 5/005; C08J 5/18; C08J 7/00; C08J 7/04; C08J 7/08; C08J 7/16;
(Continued)

(56) References Cited

U.S. PATENT DOCUMENTS

| 7,910,041 B1 | 3/2011 | Priedeman, Jr. et al. |
| 8,927,079 B2 | 1/2015 | Leventis et al. |

(Continued)

FOREIGN PATENT DOCUMENTS

| CN | 106955506 A | 7/2017 |
| CN | 104674384 B | 10/2017 |
| CN | 108586795 A | 9/2018 |

OTHER PUBLICATIONS

H.-X. Wu et al. / Carbon 45 (2007) 152-159 (Year: 2007).*
(Continued)

*Primary Examiner* — Allison G Fitzsimmons
(74) *Attorney, Agent, or Firm* — Oblon, McClelland, Maier & Neustadt, L.L.P.

(57) ABSTRACT

Vapor phase polymerization can be used to synthesize a 3D porous network of polystyrene-containing, branched carbon nanofibers on polyurethane(s), optionally using natural light (NL) initiation. NL styrene polymerization in a confined reactor containing CNF-grafted PU can provide a stable porous network. The NL can vaporize the styrene by increasing the reactor temperature and generate styrene radicals. Without CNF, the polymerization on polyurethane (PU) provides a delicate, fragile surface. Radical styrene in vapor phase can interact with CNF to produce polystyrene branches by generating active sites on CNF, while reinforcing the 3D porous structure. After polymerization, the PU surface area increased from 9 to 184 m$^2$/g and pore size decreased from 2567 to 10 Å. 3D porous networks of NL-assisted PS branched CNF supported PU can provide a hydrophobic, oleophilic surface with a water contact angle of approx 148±3°, rapidly gravity separating hexane and water without external force.

19 Claims, 11 Drawing Sheets

(51) Int. Cl.

| | |
|---|---|
| B01J 20/20 | (2006.01) |
| B01J 20/26 | (2006.01) |
| C02F 1/28 | (2006.01) |
| C08J 5/04 | (2006.01) |
| C08F 283/00 | (2006.01) |
| C08F 2/34 | (2006.01) |
| C08F 8/00 | (2006.01) |
| C08L 51/00 | (2006.01) |
| C08L 75/04 | (2006.01) |
| C08F 2/48 | (2006.01) |
| C02F 103/36 | (2006.01) |

(52) U.S. Cl.
CPC .............. *C08F 2/34* (2013.01); *C08F 2/48* (2013.01); *C08F 8/00* (2013.01); *C08F 283/002* (2013.01); *C08J 5/042* (2013.01); *C08L 51/003* (2013.01); *C08L 75/04* (2013.01); *C02F 2103/365* (2013.01); *C08J 2325/06* (2013.01); *C08J 2375/04* (2013.01)

(58) Field of Classification Search
CPC ...... C08J 7/18; C08J 7/123; C08J 7/12; C08L 75/00; C08L 75/04; C08L 75/14; C08L 75/16; C08L 75/06; C08L 75/08; C08L 75/10; C08L 75/12; C08L 51/00; C08L 51/003; C01B 32/15; B82Y 30/00; B82Y 40/00

See application file for complete search history.

(56) References Cited

U.S. PATENT DOCUMENTS 9,605,363 B2    3/2017  Zhang et al.
2010/0009165 A1   1/2010  Patel et al.

OTHER PUBLICATIONS

Baig, et al. ; Initiator-Free Natural Light-Driven Vapor Phase Synthesis of a Porous Network of 3D Polystyrene Branched Carbon Nano_ber Grafted Polyurethane for Hexane /Water Separation ; ChemistrySelect, vol. 3, Issue 28 ; Jul. 30, 2018 ; Abstract Only ; 1 Page.
Cao, et al. ; Lightweight, mechanical robust foam with a herringbone-like porous structure for oil/water separation and filtering ; Polymer Testing, vol. 72 ; pp. 86-93 ; Dec. 2018 ; Abstract Only ; 2 Pages.
Jilílek, et al. ; Polyurethane Nanofiber Membranes for Waste Water Treatment by Membrane Distillation ; Journal of Nanotechnology, vol. 2017 ; May 7, 2017 ; 8 Pages.
Bi, et al. ; Spongy Graphene as a Highly Efficient and Recyclable Sorbent for Oils and Organic Solvents ; Advanced Functional Materials 22 ; pp. 4421-4425 ; 2012 ; 5 Pages.
Cao, et al. ; Facile preparation of robust and superhydrophobic materials for self-cleaning and oil/water separation ; Colloids and Surfaces A 529 ; pp. 18-25 ; May 22, 2017 ; 8 Pages.
Wang, et al. ; Facile synthesis of flexible macroporous polypropylene sponges for separation of oil and water; Scientific Reports ; Feb. 16, 2016 ; 6 Pages.
Song, et al. ; Ultrasonic-microwave assisted synthesis of stable reduced graphene oxide modified melamine foam with superhydrophobicity and high oil adsorption capacities ; Chemical Engineering Journal 306 ; pp. 504-411 ; Jul. 25, 2016 ; 8 Pages.

\* cited by examiner

WATER PURIFICATION MATERIAL FOR PETROCHEMICALS

STATEMENT OF ACKNOWLEDGEMENT

The support provided by the Chemistry Department at King Fand University of Petroleum and Minerals (KFUPM), Dammam, Kingdom of Saudi Arabia, is gratefully acknowledged.

STATEMENT REGARDING PRIOR DISCLOSURES BY AN INVENTOR

The inventors' publication entitled "Initiator-Free Natural Light-Driven Vapor Phase Synthesis of a Porous Network of 3D Polystyrene Branched Carbon Nanofiber Grafted Polyurethane for Hexane/Water Separation" in Chemistry Select. 2018, 3(28), 8312-8318, published Jul. 30, 2018, is incorporated by reference in its entirety in this application.

BACKGROUND OF THE INVENTION

Field of the Invention

The present application relates to materials, such as polystyrene composites with carbon nanostructure and/or polyurethane substrates, suitable for organic-aqueous separations, particularly one or more petroleum components from water, as well as related separative and water purifying methods, and other uses of such materials

Description of the Related Art

Oil leaks and spills can be catastrophic hazards, especially in bodies of water such as the oceans, seas, and rivers. Oil spillage can set a number of dangerous chemicals into the water which endanger marine life, potentially effecting small organisms, such as algae, to large organisms, including mammalians, such as human beings. Examples of catastrophic oil spills in recent years include the Torrey Canyon oil spill in 1997 and the Bohai Bay oil spill from 2011.

The synthesis of cheap efficient materials capable of separating (spilled or otherwise contaminant) oil and related petrochemicals from water in bulk is a worldwide challenge. Many materials have been researched and brought into application for efficient separation of oil and water which display excellent hydrophobicity and oleophilicity. The oleophilic or superoleophilic behavior of the superhydrophobic surfaces can be explained by the surface tension difference between oil (<30 mN/m) and water (72.8 mN/m. These hydrophobic materials include modified foam and sponges, coated meshes, modified fabrics, porous ceramic membranes, and carbon-based materials. Different methods for attaining hydrophobic surfaces have been attempted, such as chemical vapor deposition, solution immersion, hydrothermal, sol-gel, and electrospinning techniques, among others.

Polystyrene (PS) grafting has been reported in the literature on a variety of substrates. PS has been grafted onto gold substrates by photochemically activated surface-initiated polymerization, using 2,2'-azobisisobutyronitrile (AIBN) initiator tethered to the Au plane and irradiating with 300 nm radiation for 6 hours in the presence of styrene to form polystyrene. The "grafting to" and "grafting from" techniques have been generally adapted to grow polymer on the surface of a substrate. In the "grafting from" technique, the initiator is immobilized on the substrate and assists to form the polymer on the surface of the substrate. For example, the initiator 2',4-azo-(2'-cyanopropyl)(4-cyano-pentanoxy-(3"-chlorodimethylsilyl)propylate) has been immobilized on the substrate to polymerize styrene to PS at high temperature.

PS has already been used in certain oil-water-separation applications. A small number of methods have been reported in which a PS surface was developed for oil-water separations. PS surfaces have commonly been generated by electrospinning or electrospraying, e.g., fabricating a PS nanofiber membrane from PS pellets by electrospinning on the stainless steel. In some cases, PS films were fabricated on polyurethane (PU). For applying PS to PU, PU films have been dipped into colloidal solutions of PS microspheres obtained from emulsion polymerization, then dried, followed by heating to give the PS microspheres some stability on the PU. Another reported material for water and oil separation is a magnetic $PS/Fe_3O_4$/graphene aerogel composite, fabricated in a multistep process.

The airbrush method has also been applied to making PS films. These methods indicate that PS could be a potential candidate for fabricating hydrophobic surfaces for the oil-water separation. Attaining stable surfaces, however, is still a challenge which requires further investigation. Moreover, initiators frequently used polymerization add to cost and hazard with negative environmental impact. Thus, there is a need to introduce an environmentally friendlier approached for producing bulk PS without tedious efforts.

The use of natural (solar) light is a major focus of $21^{st}$ century movements towards green energy. In recent years, visible light mediated organic transformations have been gaining attention. Photocatalytic reactions may provide access to purer products due to the involvement of fewer chemical catalysts. Visible light-driven electrochemical reactions are likewise highly desired due to cost-effectiveness, environmental friendliness, facile availability, and safety.

U.S. Pat. No. 7,910,041 to Priedeman, Jr., (Priedeman) discloses a method for building a three-dimensional object including extruding a build material having a temperature profile between a surface and a central region of the extruded build material in which the surface has a higher temperature than the central region of the build material. Priedeman's build material comprises a carrier material and nanofibers. Priedeman's carrier may be any thermoplastic and the nanofibers may include graphite nanotubes, but Priedeman's material is extruded into ribbons having thicknesses ranging from 100 to 1,000 μm. Priedeman exemplifies ABS, PC, PPSF/PPSU, polysulfones, polyamides, PS, PEI, polyesters, PPE, PU, PEEK, and/or fluoropolymers for its thermoplastic. Priedeman's material is structured by extruding lower particle concentration fluid to regions of higher shear near the walls of the structure's cylindrical pipe, while higher viscosity/particle concentration fluid aligns near the axis of the flow and a lower viscosity near the walls, producing a segregation effect. Priedeman does not disclose a non-extruded, three dimensional porous network (e.g., randomly arranged or at least partially unaligned) on a polyurethane substrate, nor one comprising polymer, e.g., polystyrene, branched off of the substrate and/or carbon nanofibers on the substrate.

CN 104674384 B by Zhong et al. (Zhong) discloses an electrospun three-dimensional oil-water separating material and its preparation, for water treatment. Zhong's method involves: (a) preparing a static spinning solution; (b) selecting a solvent to receive static spinning nanofibers to obtain a nanofiber solution; (c) shaping and freezing the nano fiber solution, and drying by freeze-drying to obtain the 3D nanofibers; (d) pre-oxidizing, carbonizing, and activating the 3D nanofibers to obtain 3D carbon nanofibers; (e) wrapping the 3D carbon nanofiber glue with lipophilic and hydrophobic films so as to obtain the final 3D oil-water separating material. Composition and structure can be controlled to provide a material that can separate oil and water, and is recyclable. Zhong does not appear to have polymer branches on its carbon nanostructure, but rather carbonizes its organic polymer to obtain the carbon nanostructure. Zhong does not disclose a polyurethane substrate, nor a polymer-branched material.

U.S. Pat. No. 8,927,079 to Leventis et al. (Leventis) discloses nanoporous 3D networks of polyurethane (PU) particles, e.g., PU aerogels, and their preparation. Such nanoporous networks may include polyurethane particles made of linked polyisocyanate and polyol monomers, optionally with more than 95% of the polyisocyanate-polyol linkages being urethanes. Leventis mixes polyisocyanates (e.g., diisocyanates, triisocyanates), polyols (diols, triols), and a solvent and adds a PU catalyst to link the polyisocyanates and polyols. Phase separation of particles from the reaction medium can be controlled to enable PU network formation with desirable nanomorphologies, specific surface area, and mechanical properties. Leventis uses the material for acoustic damping, oil-absorption, and bullet-proofing. However, Leventis does not mention a 3D porous network on a PU substrate, comprising polymer, such as PS, branches on carbon nanofibers on the substrate.

CN 106955506 A by Shen et al. (Shen) discloses a stable, high-flux oil-water separation super-hydrophilicity 3D porous base material including micro-nano grade hydrophilic sponge, prepared by in-situ doping, and functionally modified using a hydrophilic gel with a preservative. The hydrophilic gel adhesion and the sponge strength are improved by hydrophilic black cement. Shen's 3D porous base material separates oil-water mixtures not by conventional adsorption-desorption, but by a water through-oil baffling, filtering layer, involving adjusting the base material unit thickness and the base material compounded part area, and increasing the number of base material compounded parts. Shen's material operates using a water pump, and thus the base material is applicable to both a light oil-water mixture and a heavy oil-water mixture. Shen's material may include PU, PVA, or melamine sponge having hydrophilic silica, graphite oxide, graphene oxide, $TiO_2$, or ZnO nanoparticles. Shen does not clearly disclose a PU support hosting a carbon nanostructure having polymer branches thereon.

CN 108586795 A by Wang et al. (Wang) discloses a preparation of a superhydrophobic 3D sponge and its application to oil-water separation. Wang's material comprises dopamine, and Wang's method involves: coating polydopamine on a 3D sponge surface using an oxidizing agent and a crosslinking agent; reacting with long-chain alkylthiol or amine to prepare the superhydrophobic 3D sponge; and separating oil and water with the superhydrophobic 3D sponge continuously, under vacuum. The superhydrophobic 3D sponge in Wang may treat oily wastewater and petroleum spills. However, Wang's materials are based on dopamine-binding long-chain alkyl mercaptans, amines, or fluorine-containing substances. Wang does not disclose polymer branches on carbon nanostructures, nor PU supports adsorbing a carbon nanostructure.

U.S. Pat. No. 9,605,363 to Zhang et al. (Zhang) discloses fabricating a nanofiber ribbon or sheet with a process that includes providing a primary assembly by arranging carbon nanotube nanofibers in aligned arrays, the arrays having a degree of inter-fiber connectivity, drawing the carbon nanotube nanofibers from the primary assembly into a sheet or ribbon, and depositing the sheet or ribbon on a substrate. Zhang does not clearly disclose a 3D carbon nanostructure structure with polymer branching. Zhang describes fibril branches in its nanofibers, but does not describe polymer branches off of a carbon nanostructure, nor using a PU support in combination. Zhang does not relate to aqueous-organic separations.

US 2010/0009165 A1 by Patel et al. (Patel) discloses making multifunctional nanomaterial-containing composites by incorporating nanomaterials into such composites: (1) in a solution of dispersed nanomaterials for coating onto a substrate; and/or (2) by dispersing nanomaterials in a matrix material, such as epoxy, applied to a single substrate layer or sandwiched between adjacent layers in a multiple layer composite. A high loading of nanomaterials may be incorporated into the composites without any deterioration in processing or handling properties. Patel's substrate has a functionalized surface to react with a reactive polymer, and covalently bonding the reactive polymer with the functionalized surface. Patel describes that practically all thermoset, thermoplastic, elastomeric, and inorganic polymers are eligible for use as its matrix polymer, hosting carbon nanotubes applied using a poly-(aryleneethynylene) polymer dispersing agent, which dispersing agent later reacts with the matrix polymer. Patel does not radically polymerize a polymer onto its carbon nanotubes, and uses its composite for radiation shielding, rather than fluid separations.

*Polym. Testing* 2018, 72, 86-93 by Cao et al. (Cao) discloses super absorbent materials with mechanical robustness for oil-water separation for marine oil-spillage and industrial oily-wastewater. Cao uses a lightweight carbon nanotubes (CNTs)/thermoplastic polyurethane (TPU)/epoxy (EP) composite foam with a 3D herringbone-like structure, fabricated via an ice-templating method for oil absorption and oil-water separation. The density of Cao's sample was 0.11 $g/cm^3$ and the porosity was 63%. The durability of Cao's porous foams was demonstrated by repeated mechanical compressions in air and organic solvent. Cao investigates the influence of varied CNTs and EP content on the water contact angle (WCA) of the composite foams, calling their oil absorption capacity sufficient and selectivity high. Cao's hydrophobic foams can selectively absorb a variety of oils and organic solvents, and the adsorbates can be collected by distillation methods. Cao reports the composite foams to be useful as filters with superior capabilities for separating graphene nano-fillers from ethanol, with prospects in oil-water separation and cleanup applications. However, Cao does not use radically polymerizable monomers, let alone to create branches upon carbon nanostructures.

*J. Nanotechn.* 2017, 7143035, 7 pp. by Jiricek et al. (Jiricek) discloses self-sustained electrospun PU nanofiber membranes for direct-contact membrane distillation in an effort to find the optimum membrane thickness to maximize flux rate and minimize heat losses across the membrane and evaluate salt retention and flux at salinities up to 100 g/kg. Jiricek's membrane achieved the highest flux with the thinnest membranes and the best energy efficiency was achieved with the thickest membranes. All membranes had salt retention above 99%. Jiricek states that nanotechnology offers potential for desalination of waste waters, but that new membranes must be developed according to the target application. However, Jiricek does not describe carbon nanostructures, nor polymer branches upon such nanostructures. Jiricek's electrospun PU nanofiber membranes have contact angles with water ranging from 97.8 to 132°.

In light of the above, a need remains for composite materials useful in separating water and organic fluids, particularly for oil-water, gasoline-water, and/or hexane-water mixtures, using materials such as carbon nanofibers on PU supports having radically polymerized monomers branched off of the nanofibers, as well as methods of making and using such materials.

SUMMARY OF THE INVENTION

Aspects of the invention provide three dimensional porous network composites, which may comprise: a substrate comprising a polyurethane; carbon nanostructures directly contacting the substrate; branches comprising a radically polymerized monomer, wherein the branches are covalently bonded to the carbon nanostructure and/or the polyurethane. Such composites may be modified with any permutation of the features described herein, particularly features as follows.

Inventive composites may have a surface area in a range of from 100 to 300 $m^2$/g and/or a pore size in a range of from 5 to 25 Å. Inventive composites may have a water contact angle in a range of from 130 to 160°. Inventive composites may have ridges, visible by SEM, with an average height in a range of from 0.5 to 5 μm.

The substrate may comprise at least 90 wt. %, based on a total substrate weight, of polyurethane. The polyurethane may have a specific surface area in a range of from 7.5 to 12.5 $m^2$/g.

The carbon nanostructures may comprise at least 50 wt. %, based on total nanostructure weight, of carbon nanofibers.

The radically polymerized monomer may comprise an olefin, a styrene, a (meth)acrylate, a vinyl compound, or a mixture of these, particularly a styrene, particularly at least 85 wt. %, based on total monomer weight, of a styrene, particularly unsubstituted styrene. The branches may be covalently bonded to the carbon nanostructures. The branches have an average length of at least 1.25 nm and/or an Mn of at least 520.

Aspects of the invention include filters, comprising one or more of the inventive composites described herein.

Aspects of the invention comprise methods of fabricating one or more 3D porous network composites as described herein. Such methods may comprise: vapor phase polymerizing a radically polymerizable monomer onto a surface of a polyurethane substrate hosting carbon nanostructures, in a reactor while irradiating with UV and/or visible light, wherein the polymerizing occurs on the surface of the substrate and/or the carbon nanostructure.

Inventive method may be ones in which the reactor is sealed and/or is a glass reactor, and/or wherein the UV and/or visible light is at least partially provided by sunlight. Inventive method may be ones in which the monomer comprises styrene, and/or wherein the carbon nanostructures comprise carbon nanofibers. Inventive method may further comprise: contacting the polyurethane substrate with a suspension of the carbon nanostructures in an organic solvent to form surface modified polyurethane directly contacting the carbon nanostructures.

Aspects of the invention provide methods of purifying contaminated water. Such methods may comprise: contacting contaminated water comprising a hydrophobic organic fluid with a layer of a thickness in a range of from 1 to 5 cm of one or more of the inventive composites described herein, wherein at least 90 wt. % of the water does not pass through the layer, and wherein at least 90 wt. % of the organic fluid passes through the layer. In such methods, the organic fluid comprises a fraction and/or refined product of crude oil.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
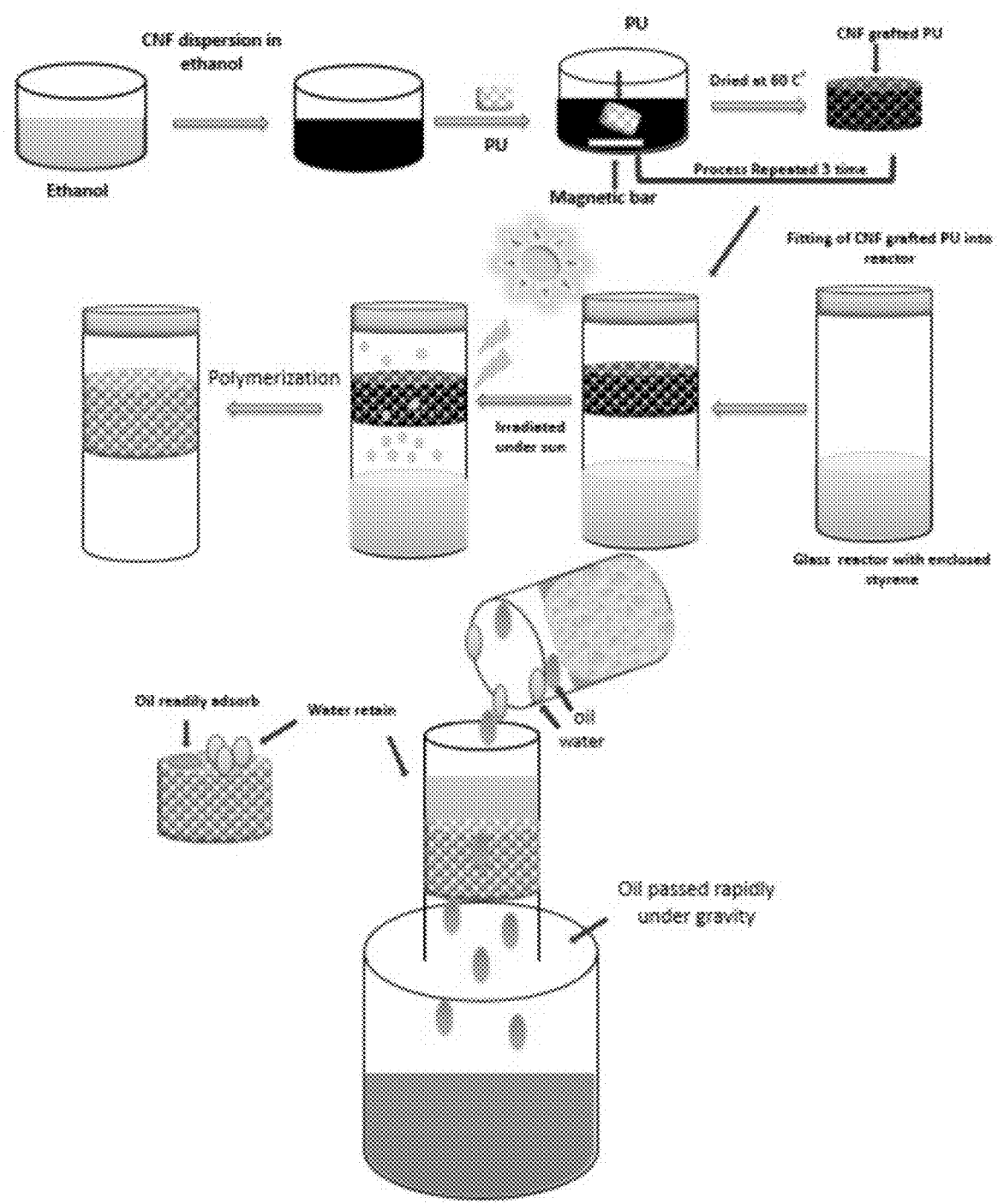
FIG. 1 shows a schematic representation of a synthesis of a 3D porous network of the carbon nanofibers (CNF) decorated polystyrene within the scope of the invention and its application in the oil and water separation.

Aspects of the invention provide three dimensional porous network composites, which may comprise: a substrate comprising a polyurethane or heteroatom (e.g., N, S, and/or O)-containing polymer; carbon nanostructures directly contacting, grafted to, adsorbed on, and/or adhered to the substrate; branches comprising a radically polymerized monomer, i.e., at least oligomeric chains of the polymerized monomer(s), wherein the branches are covalently bonded to the carbon nanostructures and/or the polyurethane. While the branches may use 2, 3, 4, or more monomers, homopolymeric branches may be less complicated to synthesize. In certain synthetic circumstances, the monomers may preferably be liquids at STP, though gases may also be useful. With room temperature liquid monomers, preferable monomer boiling points at 1 atm may be under 200, 190, 180, 175, 170, 165, 160, 155, 150, 145, 140, 135, 130, 125, 120, 115, 110, 105, 100, or 95° C. and/or at least 30, 40, 45, 50, 55, 60, 65, 70, 75, 80, 85, 90, 95, or 100° C. The branches, on average, preferably contain at least 5, 10, 15, 20, 25, 35, 50, or 75 monomers.

Inventive composites may have a BET surface area in a range of from 100 to 300, 125 to 250, or 150 to 200 $m^2/g$, e.g., at least 115, 130, 145, 160, 170, 175, 177.5, 180, 182.5, 185, 187.5, or 190 $m^2/g$ and/or up to 285, 270, 255, 240, 225, 210, 195, or 190 $m^2/g$. Inventive composites may have a BET pore size in a range of from 5 to 25 Å, e.g., at least 6, 7, 8, 9, or 10 and/or up to 22.5, 20, 17.5, 15, or 12.5 Å. Inventive composites may have a water contact angle in a range of from 130 to 160, 135 to 155, or 140 to 150°, e.g., at least 125, 132, 138, 141, 144, 145, 148, or 151°, and/or no more than 171, 168, 165, 162, 159, 156, 153, 150, or 147° C. Inventive composites may have ridges, visible by SEM, with an average height in a range of from 0.5 to 5, 0.6 to 4.75, 0.7 to 4.5, 0.8 to 4.25, 0.9 to 4, 1 to 3.75, 1.1 to 3.5, 1.2 to 3.25, or 1.3 to 3 µm, or some range using any of these endpoints.

The substrate may comprise at least 90, 91, 92, 92.5, 93, 94, 95, 96, 97, 97.5, 98, 99, 99.1, 99.5, or 99.9 wt. %, based on a total substrate weight, of polyurethane. The polyurethane may have a specific surface area in a range of from 7.5 to 12.5, 8 to 12, 8.25 to 11.5, 8.5 to 11, 8.75 to 10.5, or 9 to 10 $m^2/g$.

The carbon nanostructures may comprise at least 50, 60, 70, 75, 80, 85, 90, 95, 97.5, 98, 99, 99.5, 99.9, or 99.99 wt. %, based on total nanostructure weight, of carbon nanofibers. The nanostructures may also contain nanotubes (hollow fibers), nanospheres, such as fullerenes, nanoplates, nanocones, and/or nanochips.

The radically polymerized monomer may comprise an olefin, a styrene, a (meth)acrylate, a vinyl compound, or a mixture of these, particularly a styrene, particularly at least 85, 90, 92.5, 95, 97.5, or 100 wt. %, based on total monomer weight, of a styrene, particularly unsubstituted styrene. The branches may be covalently bonded to the carbon nanostructures. The branches have an average length of at least 1.25, 1.5, 1.75, 2, 2.5, 3, 3.5, 5, 7.5, 10, 15, 20, 25, 35, 50, 75, or 100 nm and/or up to 1000, 750, 625, 500, 375, 250, 125, 100, 85, 75, 65, 60, 55, 50, 45, 40, 35, 30, 25, or 20 nm. The branches have an $M_n$ and/or $M_w$ of at least 520, 750, 1000, 1250, 1500, 2000, 2500, 5000, 7500, 10000, 15000, 20000, or 25000 g/mol and/or no more than 100000, 75000, 50000, 25000, 15000, 10000, 7500, 5000, 2500, or 1250 g/mol.

Aspects of the invention include filters, comprising one or more of the inventive composites described herein. Inventive filters may be in the form of a solid bulk of the composite sandwiched between two membranes, e.g., cellulose, fluoropolymer, and/or fritted glass. Other useful filter forms could be supplied in the form of a powder/granular solid, which may be compressed onto a surface through which at least the organic (oil) phase material can pass. Pre-packed filters may have a disc shape having a diameter tailored for the use, such as 1, 2, 3, 5, 10, 12, 15, 20, 25, 30, 50, 75, 100, 150, or 200 cm. Useful thicknesses of the layer of composite may be at least 0.5, 1, 1.5, 2, 2.5, 3, 3.5, or 4 cm, and/or no more than 30, 25, 20, 17.5, 15, 12.5, 10, 7.5, or 5 cm, depending on the application. Such filters (filter elements) may be parts of larger gravity-based separation units, having one or more vertical columns and/or tanks (or a base having a narrowing forcing the fluid through the composite, e.g., a cone) optionally including an upper decanting element. Due to the stagnation of the purified aqueous phase upstream of the composite, systems may operate batchwise and/or on hinges (or some other tipping mechanism), to allow the eventually purified aqueous phase or water to be expelled. The filters may be attached, for example, to an oil tanker, in the event of an ocean or sea oil spill, or a tanker truck or the like, in the event of a land based (river, wastewater, plant waste, or the like) contamination. The filters may also be used to separate gas phase contaminations, particularly for wet gas mixtures, fractionation stills, syngas manufacturing, or the like.

Aspects of the invention comprise methods of fabricating one or more 3D porous network composites as described herein. Such methods may comprise: vapor (i.e., gas) phase polymerizing a radically polymerizable monomer (the monomer could be styrene, a mixture including styrene, or any of the monomers described herein) onto a surface of a polyurethane substrate hosting carbon nanostructures—bonding to the PU, the carbon nanostructure, or both, in a reactor while irradiating with UV and/or visible light, wherein the polymerizing occurs on the surface of the substrate and/or the carbon nanostructure. The light source may be the sun and/or a synthetic light source, and may include only UV light, filtered sunlight, etc. The reactor may be sealed, which may aid in vaporizing the monomer(s), and/or may be a glass or transparent reactor. The UV and/or visible light may be at least partially provided by sunlight, e.g., at least 50, 60, 70, 75, 80, 85, 90, 95, or 100% sunlight. The sunlight may be supplemented by synthetic irradiation, e.g., from optionally wavelength-selective lamps. Inventive method may preferably use unsubstituted styrene as the monomer. The carbon nanostructures comprise carbon nanofibers, e.g., at least 75, 80, 85, 90, 92.5, 95, 97.5, 98, 99, 99.1, 99.5, or 99.9 wt. % of the nanostructures may be nanofibers. Inventive methods may further comprise: contacting the polyurethane substrate with a suspension of the carbon nanostructures in an organic solvent to form surface modified polyurethane directly contacting the carbon nanostructures. The solvent for the application of the nanostructures to the PU substrate may be methanol, ethanol, propanol, isopropanol, acetonitrile, tetrahydrofuran (THF), 1,4-dioxane, dichloromethane, chloroform, carbon tetrachloride, dichloroethane, acetone, ethyl acetate, pet ether, pentane, hexane(s), dioxane, toluene, xylene(s), o-dichlorobenzene, diethyl ether, and/or methyl t-butyl ether.

Aspects of the invention provide methods of purifying contaminated water. Such methods may comprise: contacting contaminated water comprising a hydrophobic organic fluid with a layer of a thickness in a range of from 1 to 5, 1.5 to 4, or 2 to 3 cm of one or more of the composites described herein, wherein at least 90, 91, 92, 92.5, 93, 94, 95, 96, 97, 97.5, 98, 99, 99.1, 99.5, or 99.9 wt. % of the water does not pass through the layer, and/or wherein at least 90, 91, 92, 92.5, 93, 94, 95, 96, 97, 97.5, 98, 99, 99.1, 99.5, or 99.9 wt. % of the organic fluid passes through the layer. The layer may comprise more than 90, 95, or 99 wt. % of inventive composite(s), or may consist of or consist essentially of such composites—i.e., may further include one or more of such components as, e.g., binders, colorants, housings, containers, catalysts, deodorants, desulfurants, ion-exchange resins, etc., which do not affect the organic-water separative ability of the layer by more than 5, 2.5, or 1%, relative to a layer of pure composite(s). In such separative methods, the organic fluid may comprise a fraction and/or refined product of crude oil, e.g., raw crude oil, desulfurized crude oil, heavies, lights, kerosene, gasoline, diesel, naphtha, aromatics, or multiple crude fractions. The organic fluid may likewise be a refined component or mixture, e.g., hexane(s), cyclohexane(s), pet ether, decane(s), benzene, toluene, xylene(s), and/or cumene. The organic fluid may also be a vegetable oil, tallow, or mixture thereof. If the melting point of the organic phase is above 10, 15, 20, or 25° C., or if the viscosity of the organic phase is high at ambient temperature, the filtering may be conducted at temperatures above 40, 45, 50, 55, 60, 65, 70, 75, 80, or 85° C., up to just below the boiling point of the aqueous phase and/or organic phase, or, if the filters are fitted with stills, above such boiling points.

Useful polyurethanes, or their components, may be any as described in U.S. Pat. Nos. 5,668,239, 5,767,220, 5,879,608, 5,886,062, 5,968,995, 5,977,685, 6,103,851, 6,127,505, 6,258,310, 6,321,465, 6,372,810, 6,391,935, 6,433,033, 6,451,908, 6,512,033, 6,590,057, 6,699,916, 6,803,390, 6,858,680, 6,884,852, 6,965,008, 7,361,695, US 2004/0024077 A1, and/or US 2009/0044907 A1, each of which is incorporated by reference herein. Polyurethane components useful for inventive materials may use polyisocyanate(s) including two or more isocyanate groups in one unit of its molecular chain, aliphatic ring, or aromatic ring, for example, trimethylene diisocyanate, tetramethylene diisocyanate, pentamethylene diisocyanate, hexamethylene diisocyanate, 2,4,4-trimethyl hexamethylene diisocyanate, 2,2,4-trimethyl hexamethylene diisocyanate, dodecamethylene diisocyanate, 1,3-cyclopentane diisocyanate, 1,3-cyclohexane diisocyanate, 1,4-cyclohexane diisocyanate, 4,4'-methylene-bis-(cyclohexyl isocyanate), 4,4'-propylene-bis-(cyclohexyl isocyanate), 1-methyl-2,4-cyclohexane diisocyanate, 1-methyl-2,6-cyclohexane diisocyanate, 1,3-bis-(isocyanatomethyl)cyclohexane, 1,4-bis-(isocyanatomethyl) cyclohexane, m-phenylene diisocyanate, p-phenylene diisocyanate, 1,5-naphthalene diisocyanate, 4,4'-diphenylmethane diisocyanate, 2,4-tolylene diisocyanate, 2,6-tolylene diisocyanate, 4,4'-toluidine diisocyanate, tolylene-2,4-diisocyanate, 4,4'-diphenyl ether diisocyanate, 1,3-xylylene diisocyanate, and/or w, w'-diisocyanato-1,4-diethylbenzene, polymethylene polyphenyl polyisocyanate, isocyanurate modified compound(s), carbodiimide modified compound(s), and biuret modified compound(s) thereof. Useful polyol(s) may include polyester polyol(s), polyether polyol(s), polycarbonate polyol(s), polyolefin polyol(s), and/or polybutadiene polyol(s). Useful polyurethanes may have a specific surface area of at least 5, 6, 7, 8, 9, 10, 12.5, or 15 m$^2$/g and/or up to 25, 20, 17.5, 15, 12.5, 11, 10, 9, or 8.5 m$^2$/g.

Carbon nanostructures useful in the invention may be nanospheres (e.g., Bucky balls), nanotubes, nanofibers, nanochips, or the like, and be optionally functionalized. Non-limiting examples of useful carbon nanofibers are those having Pyrograf Product No. PR-25-XT-PS, PR-25-XT-LHT, and/or PR-25-XT-HHT, with a bulk densities of 0.5 to 3.5 (e.g., at least 0.25, 0.33, 0.4, 0.45, 0.5, 0.75, 1.0, 1.25, 1.5, 1.75, 2.0, 2.25, 2.5, or 2.75 and/or up to 4.0, 3.75, 3.67, 3.5, 3.45, 3.4, 3.33, 3.25, 3.20, 3.15, 3.1, 3.05, 3.0, 2.95, 2.875, 2.75, 2.625, or 2.5) lb/ft$^3$, densities, including hollow cores, of 1.4 to 1.6 (e.g., at least 1.25, 1.33, 1.4, 1.45, or 1.5 and/or up to 1.75, 1.67, 1.6, 1.575, 1.55, 1.525, 1.5, 1.475, or 1.45) g/cm$^3$, wall density 2.0 to 2.1 (e.g., at least 1.75, 1.8, 1.85, 1.9, 1.95, 2.0, 2.025 and/or up to 2.5, 2.45, 2.4, 2.35, 2.3, 2.25, 2.2, 2.15, 2.10, or 2.075) g/cm$^3$, catalyst (iron) content of less than 14,000, 12,000, 10,000, 750, 500, 250, 100, 50, or 10 ppm, outer diameters 125 to 150 (e.g., at least 100, 105, 110, 115, 120, 125, 130, 133, 135, 140, 142.5, or 145 and/or up to 175, 170, 167, 165, 162.5, 160, 157.5, 155, 152.5, 150, 147.5, 145, or 142.5) nm, inner diameter 50 to 70 (e.g., 33, 35, 37.5, 40, 42.5, 45, 47.5, 50, 52.5, 55, or 57.5 and/or up to 100, 95, 90, 87.5, 85, 82.5, 80, 77.5, 75, 72.5, 70, 67.5, 66.7, 65, or 62.5) nm, specific surface areas or 54, 39, or 24 (e.g., at least 20, 22.5, 23.3, 25, 26.7, 27.5, 30, 32.5, 35, 37.5, 38.75, 40, 41.25, 42.5, 43.75, 45, 46.25, 47.5, 48.75, or 50 and/or 65, 62.5, 61.25, 60, 58.75, 57.5, 56.25, 55, 43.25, 42.5, 41.25, 40, 38.75, 37.5, 36.25, 35, 33.75, 32.5, 31.25, 30, 28.75, 27.5, 26.25, or 25) m$^2$/g, average pore volume 0.120, 0.124, or 0.075 (e.g., at least 0.05, 0.0625, 0.065, 0.0667, 0.06875, 0.070, 0.0725, 0.075, 0.0775, 0.080, 0.085, 0.090, 0.0925, 0.095 and/or up to 0.150, 0.145, 0.1425, 0.140, 0.13875, 0.1375, 0.1367, 0.135, 0.1333, 0.1325, 0.130, 0.1275, 0.125, 0.1225, 0.120, 0.1175, 0.1167, 0.115, 0.1125) cm$^3$/g, and/or average pore diameter 89.30, 126.06, or 123.99 (e.g., at least 80, 82.5, 85, 87.5, 88.75, 89, 90, 92.5, 95, 97.5, 100, 102.5, 105, 107.5, 110, 112.5, 115, 117.5, 120, 122.5, or 125 and/or up to 150, 147.5, 145, 142.5, 140, 137.5, 136.7, 135, 133.3, 132.5, 131.25, 130, 128.75, 127.5, 126.25, 125, 122.5, or 120) A. Exemplary carbon nanostructures may have an average length of 3 μm (TEM), average diameter of 2 nm, spec. surface area >1000 m$^2$/g (BET). Exemplary multi-walled carbon nanotubes may have an average D×L of 110 to 170 (e.g., at least 100, 105, 110, 115, 120, 125, 130, 133, 135, 140, 145, 150 and/or up to 200, 195, 190, 185, 180, 175, 170, 165, 160, 155, or 150) nm×5 to 9 (e.g., at least 4, 4.5, 5, 5.5, 6, 6.5, or 7 and/or 10, 9.5, 9, 8.5, 8, 7.5, or 7) μm, a density in a range of from 1.7 to 2.1 (e.g., at least 1.5, 1.55, 1.6, 1.65, 1.7, 1.75, 1.8, 1.85, 1.9, 1.95, 2.0 and/or up to 2.25, 2.2, 2.15, 2.1, 2.05, 2.0, or 1.95) g/mL at 25° C. Exemplary carbon nanoflakes may have an aspect ratio: 25, an average length of 2.5 μm, an average width of 100 nm, and/or a surface area 40 m$^2$/g. Exemplary fullerenes may be [5,6]-fullerene-C$_{70}$, fullerene-C$_{60}$, fullerene-C$_{76}$, fullerene-C$_{84}$, ICBA, ICMA, and/or small gap fullerenes with average M$_w$~1,000 and at least 80, 85, or 90% fullerenes. Exemplary carbon nanohorns may have no more than 25, 20, 15, 10, 7.5, or 5% graphite impurity, average diameters from 2 to 5 (e.g., at least 1.5, 1.75, 2, 2.25, 2.5, 2.75, or 3 and/or up to 7.5, 7.25, 7, 6.75, 6.5, 6.25, 6, 5.75, 5.5, 5.25, 5, 4.75, 4.5, 4.25, or 4) nm by TEM, and/or spec. surface areas around 400±5, 7.5, 10, 12.5, 15, 17.5, 20, 25, 30, 35, 45, 50, 75, or 100 m$^2$/g (BET), symmetrically or asymmetrically around 400 m$^2$/g, or spec. surface area 1300 to 1400 (e.g., at least 1000, 1125, 1200, 1250, 1275, 1300, 1325, 1350 and/or up to 1750, 1625, 1500, 1450, 1400, 1375, 1350, or 1325) m$^2$/g by BET. Useful carbon nanotubes may be single-walled, double-walled, or multi-walled (i.e., more than 2). Useful nanotubes or nanofibers may have average (outer) diameters of at least 0.5, 1, 1.5, 2, 2.5, 3, 3.5, 4, 4.5, 5, 5.5, 6, 6.5, 7, 7.5, or 8 nm and/or up to 20, 17.5, 15, 12.5, 12, 11, 10, 9.5, 9, 8.5, 8, 7.5, 7, 6.5, 6, 5.5, 5, 4.5, 4, 3.5, 3, 2.75, 2.5, 2.25, 2, 1.75, 1.5, 1.25, or 1 nm, and/or average lengths of at least 0.1, 0.25, 0.5, 0.75, 1, 1.25, 1.5, 1.75, 2, 2.25, or 2.5 μm and/or up to 10, 7.5, 5, 4.5, 4, 3.5, 3, 2.75, 2.5, 2.25, 2, 1.75, 1.5, 1.25, 1.125, 1, or 0.875 μm.

Aspects of the invention provide 3D porous networks of polystyrene (PS), carbon nanofibers (CNF), polyurethane (PU), preferably synthesized using natural light as an initiator, styrene as a monomer, and CNF and PU as a substrate in a confined reactor. The product can be used for the separation of oil and water, alternately using hexane as a model for oil. In a confined (closed) reactor under sunlight, first, styrene can be converted to vapors, these vapors of styrene can be sufficiently converted into styrene radicals by continuous exposure to the sunlight, and the styrene radicals can interact with the CNF and be polymerized to form polystyrene branches. The growth of the polystyrene branches on the CNF can cause the expansion of the polyurethane suspended and/or hung in the reactor. At the bottom of the reactor, a weak layer of PS can be observed which indicates that most of the polymerization in a process as described herein takes place in the vapor phase. The resulting 3D porous network of the PS-branched CNF/PU can efficiently separate hexane and water.

Materials within the scope of the invention are preferably not extruded, or may contain randomly arrayed polymerized branches—i.e., not aligned by extrusion—upon a polyurethane support grafted/laden with structured carbon nanofiber (or other carbon nanostructure). Inventive materials need not be drawn and are generally not aligned upon an axis and/or twisted. Inventive composites can avoid using anodes, cathodes, and/or further electronic components. Using polarity properties of the polymer used for branching and/or the non-polarity of the carbon nanostructures, inventive materials may limit passage of ions and/or other polar materials.

Inventive materials generally have a random distribution of polymer branches on the support, i.e., generally not a gradient concentration of features or systematically varied distribution of polymer branches and/or carbon nanostructures. Polymer branches on inventive materials are generally exclusively radically polymerized, e.g., excluding polyamides, polyesters, polycarbonates, polysulfones, polyimides, polyethers (incl. polyalkylene oxides), and/or polyurethanes. Supports useful in inventive materials may exclude PVA, melamines, or any polymers beyond PU, as desired, though blends, copolymers, or terpolymers with PU may be implemented. The amount of PU in the support may be at least 50, 65, 75, 80, 85, 90, 91, 92, 92.5, 93, 94, 95, 96, 97, 97.5, 98, 99, 99.1, 99.5, or 99.9 wt. % of a total weight of the support. Inventive materials may contain less than 25, 15, 10, 5, 2.5, 1, 0.1, 0.01, or 0.001 wt. %, based on organic content, of thiol compounds, fluorinated compounds, and/or dopamine. Inventive materials may comprise less than 10, 5, 2.5, 1, 0.1, 0.01, or 0.001 wt. %, based on organic content, of organic diamine(s), particularly ethylenediamine, butanediamine, and/or pentanediamine, either in free or reacted, polymerized and/or cross-linked, form.

Materials according to the invention may comprise no more than 10, 7.5, 5, 4, 3, 2, 1, 0.5, 0.1, or 0.01 wt. %, relative to the total polymer content, of polydimethylsiloxane(s), or even no detectable amounts thereof. Inventive materials may additionally or alternatively comprise no more than 15, 10, 7.5, 5, 4, 3, 2, 1, 0.5, or 0.1 wt. %, relative to the total inorganic weight, of optionally hydrophilic $SiO_2$, graphite oxide, graphene oxide, $TiO_2$, and/or ZnO, as nanoparticles or otherwise. Inventive materials are generally not treated with oxidizing agents, such as persulfate, periodate, and/or perchlorate. Inventive materials may avoid materials for enhancing electrical conductivity, i.e., contain no more than 5, 4, 3, 2, 1, 0.5, 0.1, 0.001, 0.0001, or 0.00001 wt. %, relative to the total material weight, of elemental metals, metal alloys, electrically conducting organic polymers, and/or (additional) conducting forms of carbon.

Example—Materials

Analytical grade chemicals were used in the examples described herein. Ethanol was purchased in Baker Analyzed® Reagent quality. Hexane was obtained from Sigma-Aldrich (Germany). Distilled water, obtained from the laboratory-based distillation unit, was used in the examples. Polyurethane was purchased from the local market. The carbon nanofiber had a diameter <1μm, length <100 μm and density of 2.1 g/cm³.

Instrumentation

Materials prepared as described below and utensils used were dried in a Blue M oven. The Brunauer-Emmett-Teller (BET) surface area and pore size were calculated using a MicromeriticsTriStar II Plus instrument. Fourier-transform infrared (FT-IR) spectroscopy was conducted with a Thermo Scientific Nicolet iS10 instrument. Rotation and stirring was conducted with a Thermo-Scientific magnetic stirrer.

Synthesis of 3D-NL-PS/CNF/PU

Prior to fabrication, a polyurethane (PU) support was thoroughly washed with ethanol under sonication for 30 minutes to remove any adsorbed dirt or particles on its surface. After that, the PU support was dried in an oven. For carbon nanofibers (CNF) grafting, the dried PU support was dipped and stirred into a suspension of CNF in ethanol at a concentration of 1 mg/mL. After that, the CNF-grafted PU support was removed from the ethanol and cured in an oven at 60° C. overnight.

Into clean, transparent glass reactors, 2 mL styrene (MW: 104.15 g/mol, d: 0.909 g/mL, ~2.200 g, 0.0211 mol) were added. In these reactors, pure PU and CNF-grafted PU supports was suspended in so as to hang in the middle of the reactors and without touching the bottom of the reactor. The reactors were tightly closed to minimize the escape of styrene, then put under natural sunlight. The sunlight continuously increased the temperature of the sealed reactors, causing the formation of the styrene vapors which penetrated into the PU supports. Styrene polymerization was initiated by the natural light, whereby the styrene vapors started to polymerize on the surface of the pure PU and CNF-grafted PU. This process was continued until no liquid styrene remained in the bottom of the reactors. This protocol resulted in the formation of a natural light fabricated 3D porous network of polystyrene branched polyurethane (NL-PS/PU) and three dimensional natural light polystyrene-branched CNF-grafted polyurethane (3D-NL-PS/CNF/PU). These 3D porous networks were evaluated for oil and water separation. An embodiment of the fabrication process is illustrated representatively in the FIG. 1.

The various fabricated 3D porous networks were morphologically investigated by scanning electron microscopy (SEM). The growth of the polystyrene on the surface of PU and the CNF-grafted PU can be observed in the SEM images in FIG. 2. The 3D porous networks produced as described herein were also investigated by FT-IR, as shown in FIG. 3. The major portion of these macromolecules are similar or identical, so their FT-IR spectra are very similar, with minor changes in peak shifts.

The effect of polystyrene (PS) and CNF-grafted PS on the polyurethane (PU) was investigated using the BET method for the adsorption and desorption isotherm of nitrogen for an overnight on the fabricated materials. Pure PU showed a surface area of 9 m²/g, and after the formation of a 3D porous network of PS on the pure PU, the surface area was increased to 69 m²/g. This observed surface area increase may be due to the uniform formation of PS on the PU support providing more (roughened) surface area, which may be inferred from the SEM images. However, CNF grafting also shows a substantial impact on the surface area.

Figure 5:
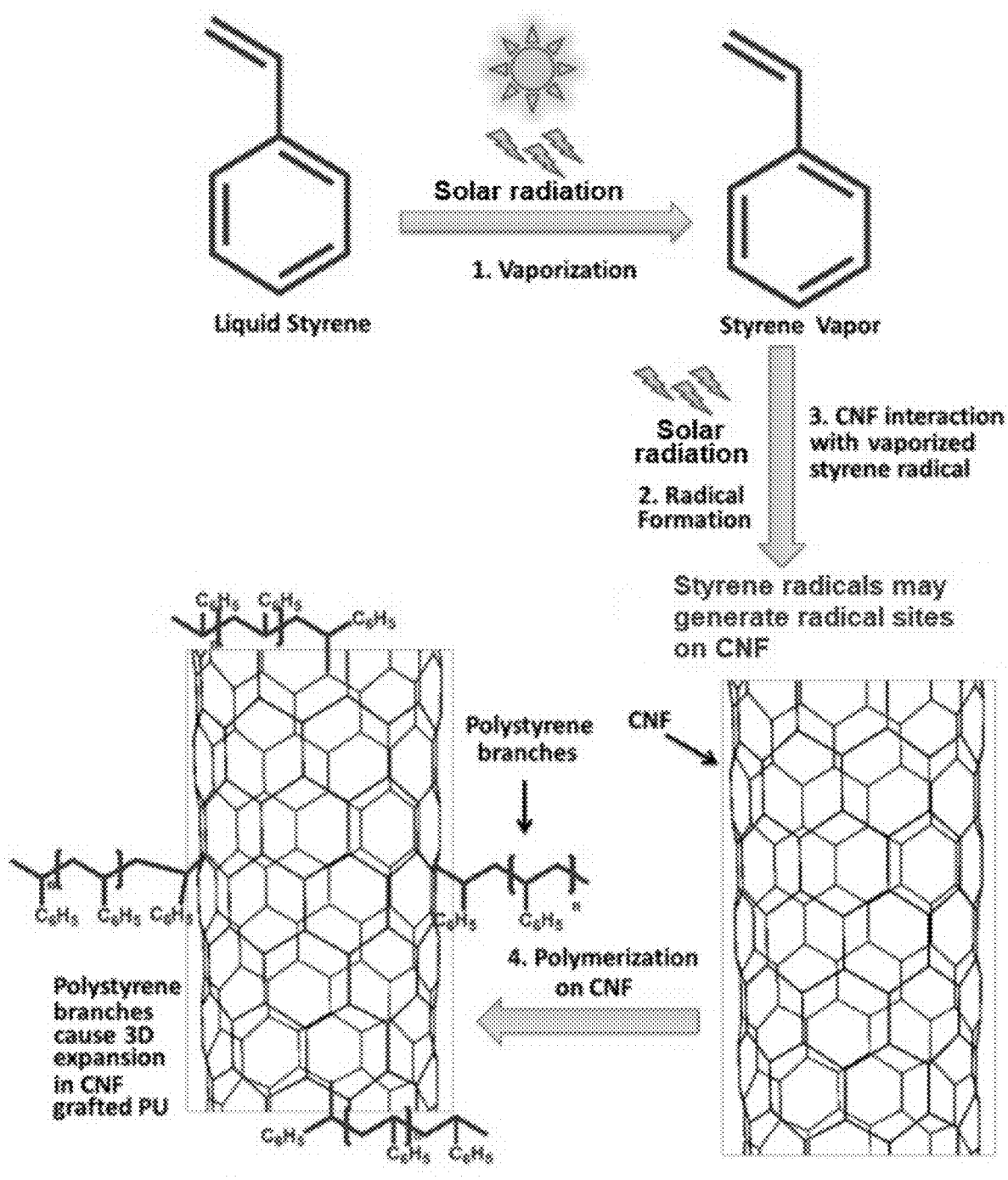
FIG. 5 shows a proposed mechanism of the styrene polymerization on the CNF.

The polystyrene branching is formed from styrene by radical formation. The styrene radical can be formed either by a chemical initiator or by exposure to a natural or artificial light source. As disclosed here, the vapor phase polymerization of the styrene can be successfully initiated with natural light. The confined (glass) reactor and the CNF can play a role in attaining stable 3D porous network. The choice of the reactor and the amount of the liquid monomer (e.g., styrene) can influence the morphology of the target material. The PU is preferably hung in the middle of the (glass) reactor to avoid the direct contact with the liquid monomer (e.g., styrene), as contacting the liquid may affect the porosity and uniform growth of the PS. Glass reactors, containing liquid monomer, such as styrene, can be advantageously exposed to the natural sunlight. The styrene begins to vaporize in the reactor and partially convert to styrene radicals. These styrene radicals may generate active sites on the PU and/or CNF so as to initiate (further) polymerization. As a result, polystyrene branches are formed on the active sites of the CNF, a possible mechanism for which 3D-NL-PS/CNF/PU synthesis is illustrated in FIG. 5.

The process using natural light, rather than one or more chemical initiators in a thermal process, has several advantages over thermal processes of polymerizing styrene and/or other radically polymerizable monomers at a given temperature. Thermal processes generally yield nonporous polymers, e.g., polystyrene, which allow only limited, if any, oil through-passage. Further modification of nonporous materials is often difficult due to the stiffness of such nonporous materials after synthesis.

Hexane and Water Separation

A composite including polystyrene (PS), carbon nanofibers (CNF), and polyurethane (PU) can provide a porous network of 3D-NL-PS/CNF/PU with a superhydrophobic surface and/or membrane effect. Polyurethane (PU) surfaces have low hydrophobicity, for which reason PU passes water and hexane similarly, i.e., is insufficient to preferentially retain one or the other. Surface hydrophobicity in PU supports can be improved by grafting carbon nanostructures, esp. carbon nanofibers (CNF), onto the polyurethane. Prior to CNF coating, PU supports can display a yellow color, but after coating with CNF, the grafted composite can take on a darker, or black, color. The darker color is an indication that CNF is retained on the PU surface. The 3D-NL-PS/CNF/PU samples synthesized according to the method described above can have superhydrophobic channels with macro and micropores which allowed the fast passage of hexane, while substantially to fully preventing the passage of water, i.e., no more than 15, 10, 5, 4, 3, 2, 1, 0.5, 0.1, 0.01, 0.001, 0.0001, or 0.00001 wt. % or no more than trace detectable amounts of water, relative to the original amount.

Figure 6A:
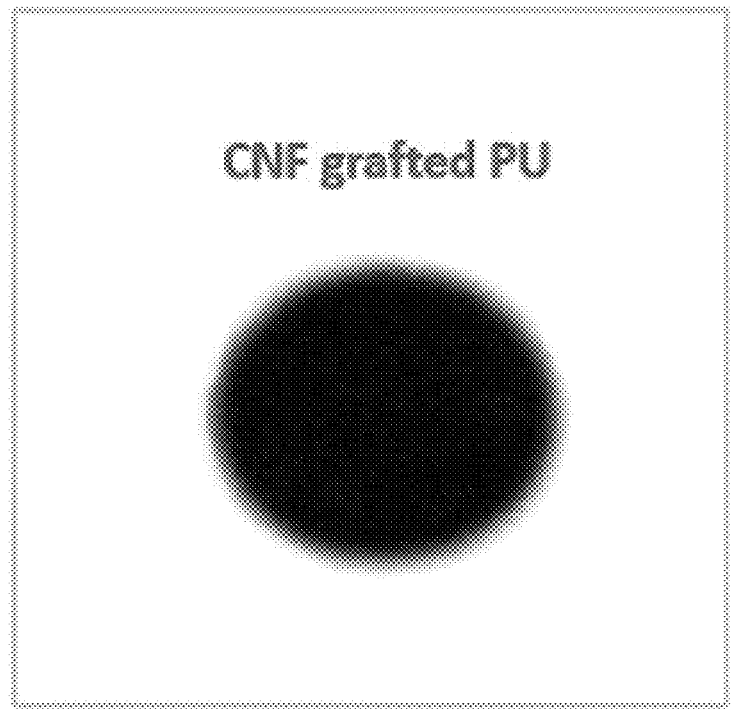
FIG. 6A shows CNF-grafted PU as used in an inventive example.
Figure 6B:
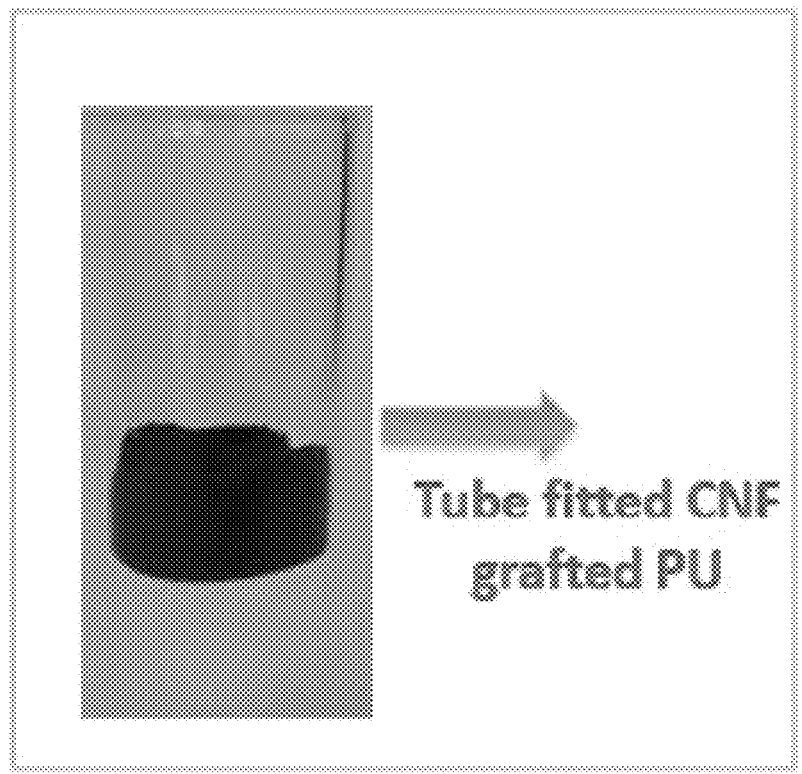
FIG. 6B shows CNF-grafted PU fitted into a pyrex glass reactor for styrene polymerization.

During the fabrication process, the CNF-grafted PU support material can be auto-fit into the reactor, as seen in FIG. 6B. Synthetic or solar irradiation, i.e., from unfiltered or filtered sunlight, may pass through a glass reactor, or otherwise be irradiated into an alternate reactor, to vaporize the styrene. Continuous exposure to the irradiation, e.g., from sunlight, particularly during the daytime, can cause the formation of styrene radicals in the styrene vapor. Styrene radicals so generated may interact with the CNF-grafted PU supported and polymerize on radical-containing points on the support to yield a 3D-NL-PS/CNF/PU. During polymerization, the CNF grafted PU can expand in volume, potentially assisting the 3D-NL-PS/CNF/PU to fit into the tube-shaped reactors.

Figure 8A:
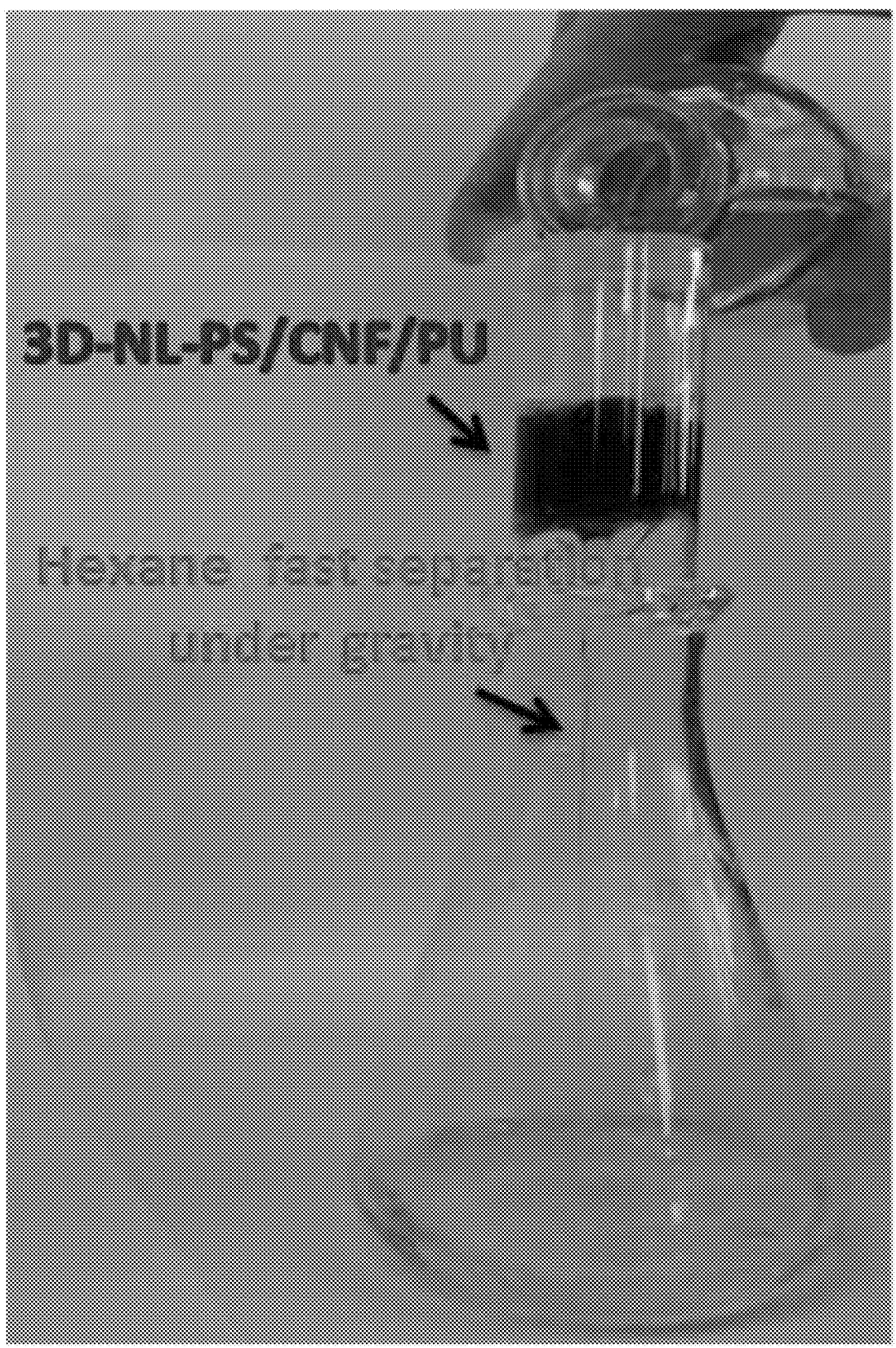
FIG. 8A shows a mixture of hexane and methylene blue colored water being subjected to a 3D-NL-PS/CNF/PU plug according to the invention.

The practicability of the 3D-NL-PS/CNF/PU was evaluated for bulk separations of hexane and water, which should function analogously for fluid petroleum fractions, such as unrefined crudes, esp. with APIs above 20°, gasoline, naphtha, pet ethers, aromatics, diesel, kerosene/jet fuel, fuel oil, and/or some mixture of any of these. Methylene blue color was added to water along with colorless hexane in a glass bottle, and this fluid mixture was passed through a glass tube fitted with 3D-NL-PS/CNF/PU material (plug) in the opening of a titration flask, as shown in FIGS. 8A and B.

The 3D-NL-PS/CNF/PU sample displayed an (unexpected) extraordinary and opposite behavior towards hexane and water. The hexane contacting the 3D-NL-PS/CNF-grafted PU passed quickly through the filter/plug merely under the force of gravity, i.e., without applying any external force. This property of the 3D-NL-PS/CNF/PU sample surface indicates that 3D-NL-PS/CNF/PU sample is highly oleophilic and the presence of PS may not only impart oleophilicity to the CNF-grafted PU but also provide channels suitable for the fast through-passage of hexane. The 3D-NL-PS/CNF/PU plug seen in FIGS. 8A and B acted as smart surface and allowed the hexane passage very rapidly, like a bulk or a stream instead of in drops.

However, the behavior of the 3D-NL-PS/CNF/PU sample towards hexanes, and related organics, was entirely the opposite for water contacting with the 3D-NL-PS/CNF/PU sample surface. The channels in the 3D-NL-PS/CNF/PU can prevent passage of 75, 80, 85, 90, 91, 92, 92.5, 93, 94, 95, 96, 97, 97.5, 98, 99, 99.1, 99.5, 99.9, 99.99, or 99.999 wt. % of a total weight of the water in a mixture of water and organic fluid, e.g., hexane or a different petroleum product/fraction. The water can be mainly to entirely retained by the surface of inventive materials, indicating that the surface is superhydrophobic and the channels can largely (e.g., greater than 90, 95, 97, 98, 99, 99.5 wt. % or more) to entirely prevent the passage of the methylene blue colored water through the layer of 3D-NL-PS/CNF/PU material, which can be seen in FIG. 7C. The separated hexane, i.e., organic phase, from the mixture of water/hexane was entirely free from water and/or a water phase, and the separation efficiency was found to be greater than 99 wt. % (e.g., 99.5, 99.75, 99.9, 99.95, 99.99 wt %, or more). The separation of hexane and water was ultrafast due to the porous nature of the 3D-NL-PS/CNF/PU material, exhibiting a flux of around 4 $Lm^{-2}s^{-1}$, e.g., at least 3, 3.25, 3.33, 3.5, 3.67, 3.75, 3.85, 3.9, 3.95, 4, 4.05, 4.1, 4.15, 4.25, 4.5, 4.75, 5, 5.5, or 6 $Lm^{-2}s^{-1}$ and/or up to 10, 9, 8, 7, 6.5, 6, 5.5, 5.25, 5, 4.75, 4.67, 4.5, 4.33, 4.25, 4.15, 4.05, 4, or 3.95 $Lm^{-2}s^{-1}$. Such generally scalable flux can be achieved for a filter/plug layer thicknesses of 1, 1.25, 1.5, 1.75, 2, 2.125, 2.25, 2.375, 2.5, 2.625, 2.75, 2.875, 3, 3.125, 3.25, 3.375, 3.5, 3.625, 3.75, 3.875, or 4 cm, and/or a diameter 2.5, 3, 3.5, 4, 4.5, 5, 5.5, 6, 6.5, or 7 cm.

After filtration/separation, the 3D porous NL-PS/CNF/PU was removed from the tube for further investigation of its superhydrophobic and the oleophilic behavior against water and hexane. Water was added dropwise onto the surface of the 3D-NL-PS/CNF/PU. The hydrophobicity of the material prevented passage through the 3D porous network and the water starts falling from the sides of the 3D-NL-PS/CNF/PU instead of passing through it. Subsequently, hexane was added dropwise onto the same 3D-NL-PS/CNF/PU sample. The 3D-NL-PS/CNF/PU surface demonstrated an unexpectedly advantageous behavior towards the hexane. As fast as a drop of hexane touched the surface of the 3D-NL-PS/CNF/PU sample, it disappeared, passing through the 3D-NL-PS/CNF/PU sample, indicating that the 3D-NL-PS/CNF/PU surface is superoleophilic. Most prior reports of such materials describe using a pump to attain sufficient driving force to push hexane through the hydrophobic surface. However, in porous 3D-NL-PS/CNF/PU materials as prepared herein, the hexane can pass very rapidly through the sample under gravity alone.

Similarly, the separation of an emulsified water/hexane (i.e., aqueous/organic) mixture is a useful application. Inventive 3D-NL-PS/CNF/PU materials described herein can successfully separate water and hexane from emulsions.

The separation mechanism of water-in-hexane emulsions can be explained by the superhydrophobic nature of the inventive materials. During the separation of emulsions, polar water and nonpolar hexane both came into contact with the upper surface of the hydrophobic (e.g., 3D-NL-PS/CNF/PU) material. The 3D network selectively absorbs/passes the non-polar component while the water was completely repelled/rejected by the surface. PS-branched CNF-grafted PU can plays a role in selectively absorbing the non-polar component. Similarly situated radically polymerized monomers can perform analogously. The nonpolar or oil-phase component can spread on the PS-branched CNF (passing through) while the aqueous component is released from the emulsion. Due to the surface superhydrophobicity, the water can be entirely retained on the upper surface of the 3D network while the absorbed hexane can pass through the 3D-NL-PS/CNF/PU due to its fine hydrophobic channels, even under only the force of gravity.

A 3D porous architecture of polystyrene-branched carbon nanofiber-grafted polyurethane is preferably synthesized by vapor phase (gas) polymerization. Natural light is sufficient to initiate the polymerization in a confined (sealed), preferably glass, container comprising a geometrically centrally hung CNF-grafted PU. Extensive PS branching can be introduced onto the active sites of the CNF and the PU. The vapor phase polymerization can introduce superhydrophobic channels, selective towards non-polar (organic or oil-phase) components and repulsive to water, suppressing the passage of water through. These channels can provide rapid passage for hexane and/or further petroleum byproducts, fractions, or synthetcis, under gravity without any external force. The polymerization of, e.g., PS, onto the CNF-grafted PU can substantially increase the material's surface area, e.g., from 9 to 184 $cm^2$, such as 10, 15, 20, 25, 30, 35-fold. Such "grafting" of a radically polymerizable monomer onto the CNF-grafted PU can reduce the pore size. Inventive materials can have consistent properties over 4, 5, 6, 7, 8, 9, 10, or more weeks, i.e., retaining 90, 95, 97.5, 99, or 99.5% of their properties, such as superhydrophobicity, robustness, stability, and/or water contact angle. The surface of inventive materials can provide a contact angle of approx. 148±3° with water. Natural light initiation, sealed glass reactors, and/or vapor phase polymerization can contribute to the properties of the 3D-NL-PS/CNF/PU, also allowing large scale production of such superhydrophobic materials. 3D-NL-PS/CNF/PU can effectively separate hydrophilic and oleophilic fluids, generally as liquids, but also gases and mixtures.

Referring now to the drawings, wherein like reference numerals designate identical or corresponding parts throughout the several views.

FIG. 1 shows a representation of the reaction protocol for the formation of a natural light fabricated 3D porous network of polystyrene branched polyurethane (NL-PS/PU) and three dimensional natural light polystyrene-branched CNF-grafted polyurethane (3D-NL-PS/CNF/PU) as described herein.

Figure 2:
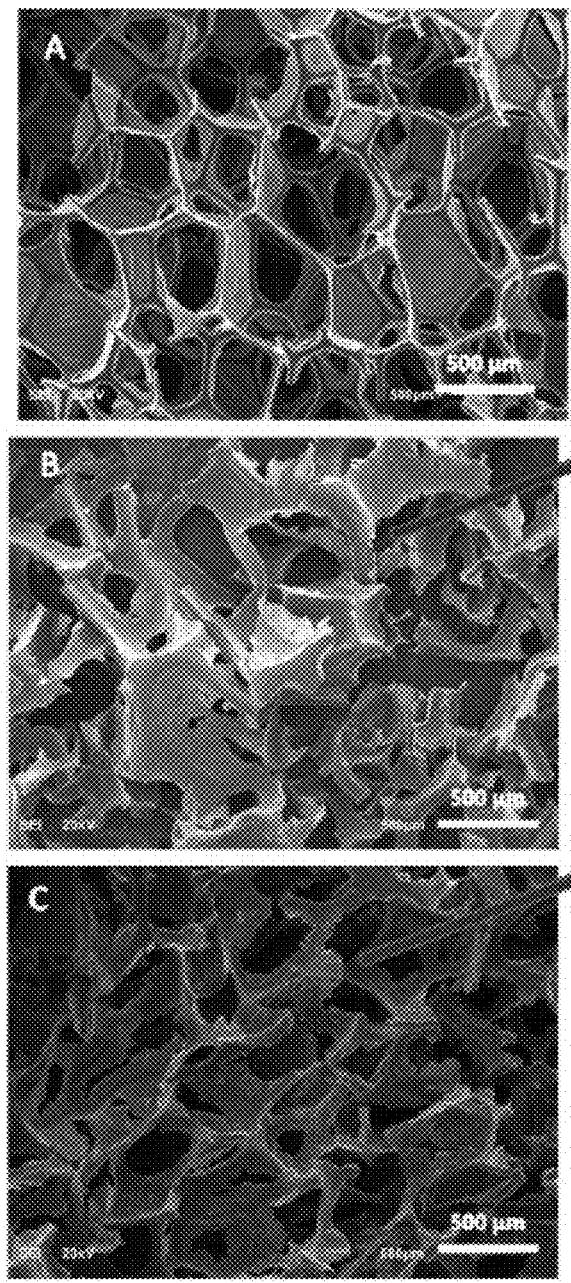
FIG. 2 shows scanning electron microscope (SEM) images of (A) polyurethane (PU), (B) 3-dimensional natural light polystyrene/polyurethane (3D-NL-PS/PU), and (C) 3-dimensional natural light polystyrene/carbon nanofiber/polyurethane (3D-NL-PS/CNF/PU)
Figure 2:
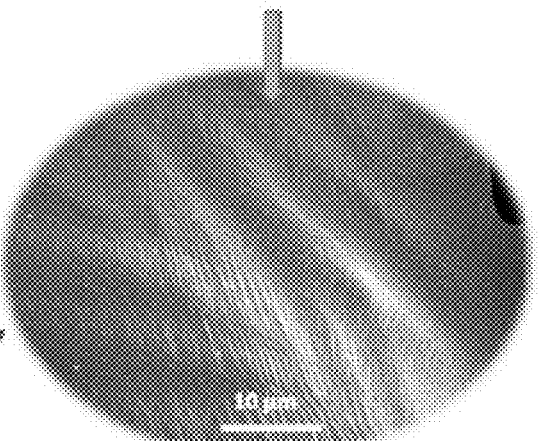
Figure 2:
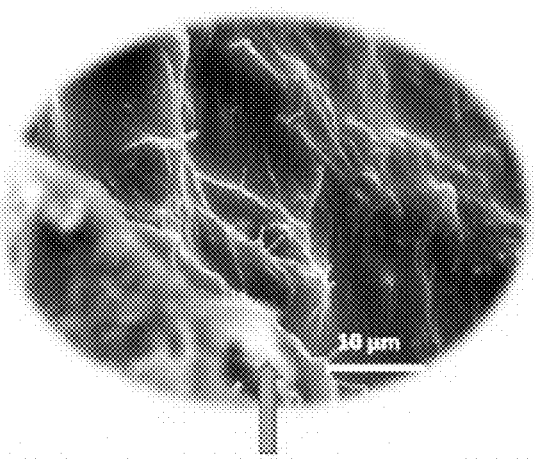
Figure 3:
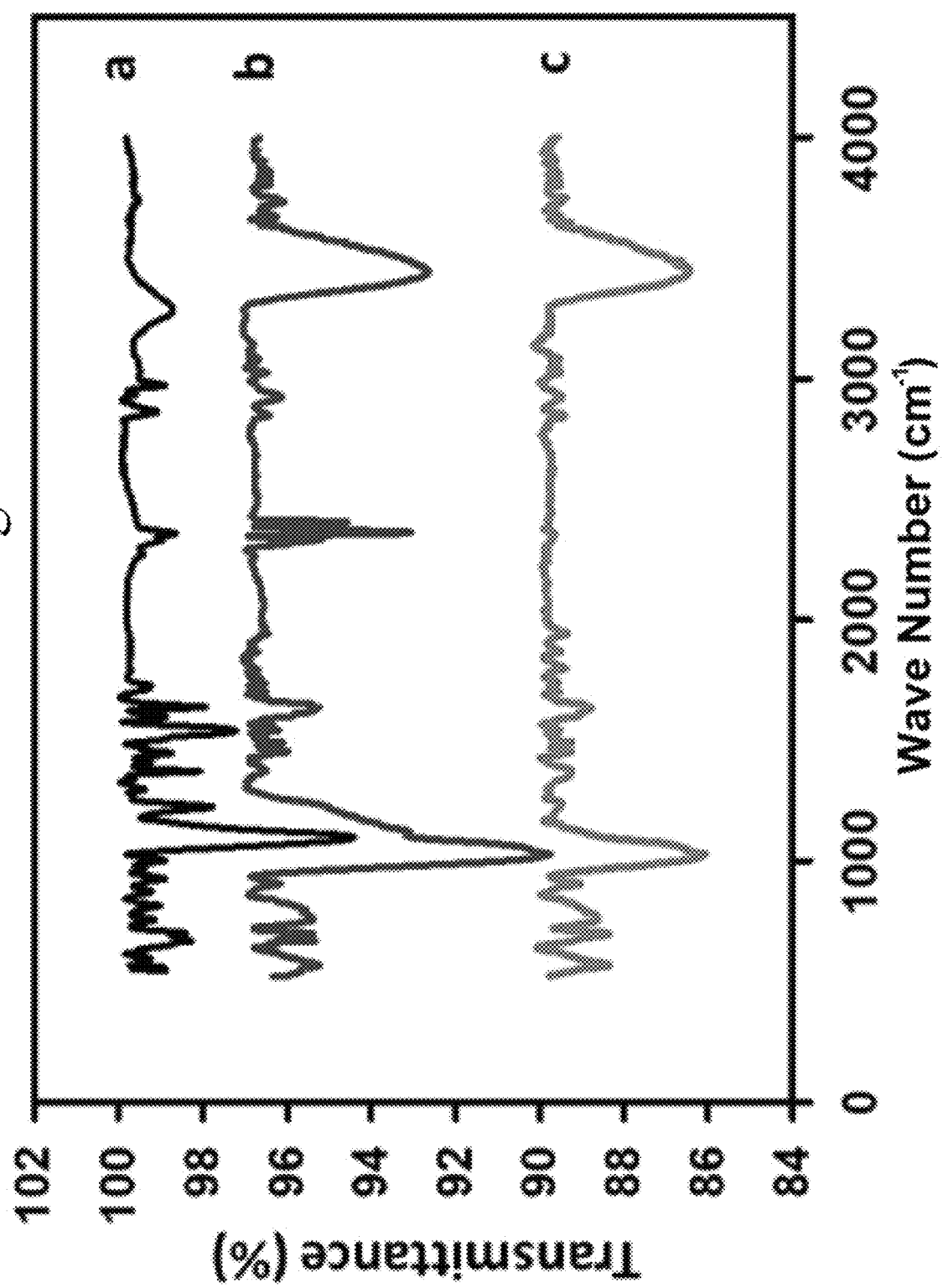
FIG. 3 shows Fourier-transform infrared (FTIR) spectra of (a) PU, (b) 3D-NL-PS/PU, and (c) 3D-NL-PS/CNF/PU.

FIG. 2 illustrates scanning electron microscopy (SEM) of the various fabricated 3D porous network, wherein the growth of polystyrene (PS) on the surface of polyurethane (PU) and the carbon nanofiber-grafted (CNF-grafted) PU can clearly be observed from SEM. The morphological structure of pure polyurethane is shown in image A of FIG. 2, wherein the growth of the PS around the PU support can be seen. Due to the growth of the PS, the walls of the PU become thick and slightly wider than pure polyurethane. Higher magnification, in the upper right expanded view of image B from FIG. 2 demonstrates uniform planar growth of the polystyrene on the PU. Physical examination of the surface of the 3D-NL-PS/PU specimen revealed surface fragility. The surface of the PU appears to become delicate after vapor polymerization of the styrene. SEM images of the 3D-NL-PS/CNF/PU revealed a darkened or black-colored formation of the material, while the white color was prominent in the case of the PS/PU. The appearance of the darkened or black-colored polystyrene is likely due to the CNF grafting on the PU. The vapor phase polymerization allows radical styrene vapors to penetrate and/or surround the CNF and initiate the polystyrene branches. The polystyrene on the CNF/PU can have a rougher, wavier, and/or outwardly extended (from the surface) surface morphology. This branching and/or corresponding roughening phenomenon may be due to the high surface area of the carbon nanofiber, which provides more active sites for the vapor phase polymerization, e.g., of styrene. The wavy and roughly porous network of 3D-NL-PS/CNF/PU may be responsible for its efficiency in separating organics, such as oil and/or hexane, from aqueous phases, such as water.

In place of, or in addition to styrene, analogous frameworks may be constructed using any volatile monomer(s) subject to radical polymerization, including one or more (meth)acrylates—such as methyl methacrylate, methyl acrylate, ethyl methacrylate, ethyl acrylate, acrylonitrile, acrylic acid, methacrylic acid, 2-ethylhexyl acrylate, hydroxyethyl methacrylate, butyl acrylate, butyl methacrylate, and/or trimethylolpropane triacrylate (TMPTA); olefins—such as ethylene, propylene, butylene, isobutene, 1,3-butadiene, isoprene, and/or tetrafluoroethylene; vinyl monomers—such as vinyl chloride, 2-chloroethyl vinyl ether, vinyl alcohol, vinylidene dichloride, vinylidene difluoride, and/or vinyl acetate (or other esters); further styrenics—such as divinylbenzene, 3-chloromethylstyrene, 4-chloromethylstyrene, 4-methyl styrene, 2-chlorostyrene, 3-chlorostyrene, 4-chlorostyrene, m-fluorostyrene, o-fluorostyrene, p-fluorostyrene, 2,5-dichlorostyrene, 2,6-dichlorostyrene, 2,6-difluorostyrene, 2-bromostyrene, 3-bromostyrene, 4-bromostyrene, 2-iodostyrene, 2-vinylmesitylene, 3-vinyltoluene, 2-vinylmesitylene, 2-vinyltoluene, 4-tert-butylstyrene, 4-tert-butoxystyrene, 3,4-dimethoxystyrene, 2,4-dimethyl styrene, 2,5-dimethyl styrene, N,N-dimethylvinylbenzylamine, 4-acetoxystyrene, 4-chlorostyrene, 4-cyclohexylstyrene, 4-dodecylstyrene, 4-ethoxystyrene, 4-iso-propyl styrene, 4-methoxystyrene, 4-methyl styrene, 4-N-(vinylbenzyl) aminobutyric acid, 4-nitrostyrene, 4-octylstyrene, 4-phenoxystyrene, 4-styrenesulfonyl chloride, 4-sulfonamidostyrene, 4-vinylbenzoic acid, 4-vinylbenzyl acrylate, 4-vinylbenzyl hexafluoroisopropyl ether, 4-vinylbenzyl methacrylate, 4-vinylbenzyl trifluoroacetate, alpha-methyl styrene, beta-methoxystyrene, beta-methyl styrene, beta-nitrostyrene, hydroxymethylstyrene, N-vinylbenzylcaprolactam, N-vinylbenzylpyrrolidone, pentafluorostyrene, sodium 4-styrenesulfonate, tert-butoxycarbonyloxystyrene, vinylbenzyl chloride, vinylbenzyl diethyl phosphonate, vinylbenzyl diethyl sulfonium chloride, vinylbenzylphosphonium chloride, sodium vinylbenzylsulfonate, and/or vinylbenzyltrimethylammonium chloride; and the like, as well as mixtures of two or more of any of these. Charged species may generally be less preferred, though the monomer mixture may be tailored for the fluid components, e.g., crude in water, gasoline in water, hexane in water, to be separated. Generally, the monomer(s) should have a solubility in water of no more than 0.1, 0.075, 0.05, 0.033, 0.03, 0.025, 0.02, 0.015, 0.01, 0.005, 0.001, 0.0005, or 0.0001 wt. %. The monomer may comprise at least 75, 80, 85, 90, 91, 92, 92.5, 93, 94, 95, 96, 97, 97.5, 98, 99, 99.1, 99.5, or 99.9 wt. % of a total weight of all monomers, of any of the aforementioned monomers, generally uncharged, N-free, 0-free, I-free, Br-free, Cl-free (or halide-free), and/or heteroatom-free monomers.

FIG. 3 shows FT-IR spectra of the 3D porous networks produced as described herein. The characteristics peaks of polyurethane (PU) can be observed in the typical regions, with an N—H stretching peak at 3290 cm$^{-1}$, which was shifted in 3D-NL-PS/PU to 3444 cm$^{-1}$, and in 3D-NL-PS/CNF/PU to 3446 cm$^{-1}$. The urethane —C=O peak visible in the PU spectra (spectrum "a") at 1727 cm$^{-1}$ either did not appear or is difficult to observe in the 3D-NL-PS/PU and 3D-NL-PS/CNF/PU. The —C—H symmetric and asymmetric vibration in pure PU can be observed at 2863 and 2972 cm$^{-1}$, respectively. After the polystyrene modification, the negative shift in the —C—H symmetric and asymmetric peaks were observed in 3D-NL-PS/CNF/PU it was shifted to 2845 and 2927 cm$^{-1}$ (spectrum "c"). The PU generally demonstrates poor hydrophobic behavior due to oxygen-containing functionalities, whereas the carbon nanofiber and the polystyrene do not contain any oxygen functionalities likely contributing to the ultra-hydrophobic behavior to 3D-NL-PS/CNF/PU.

Figure 4A:
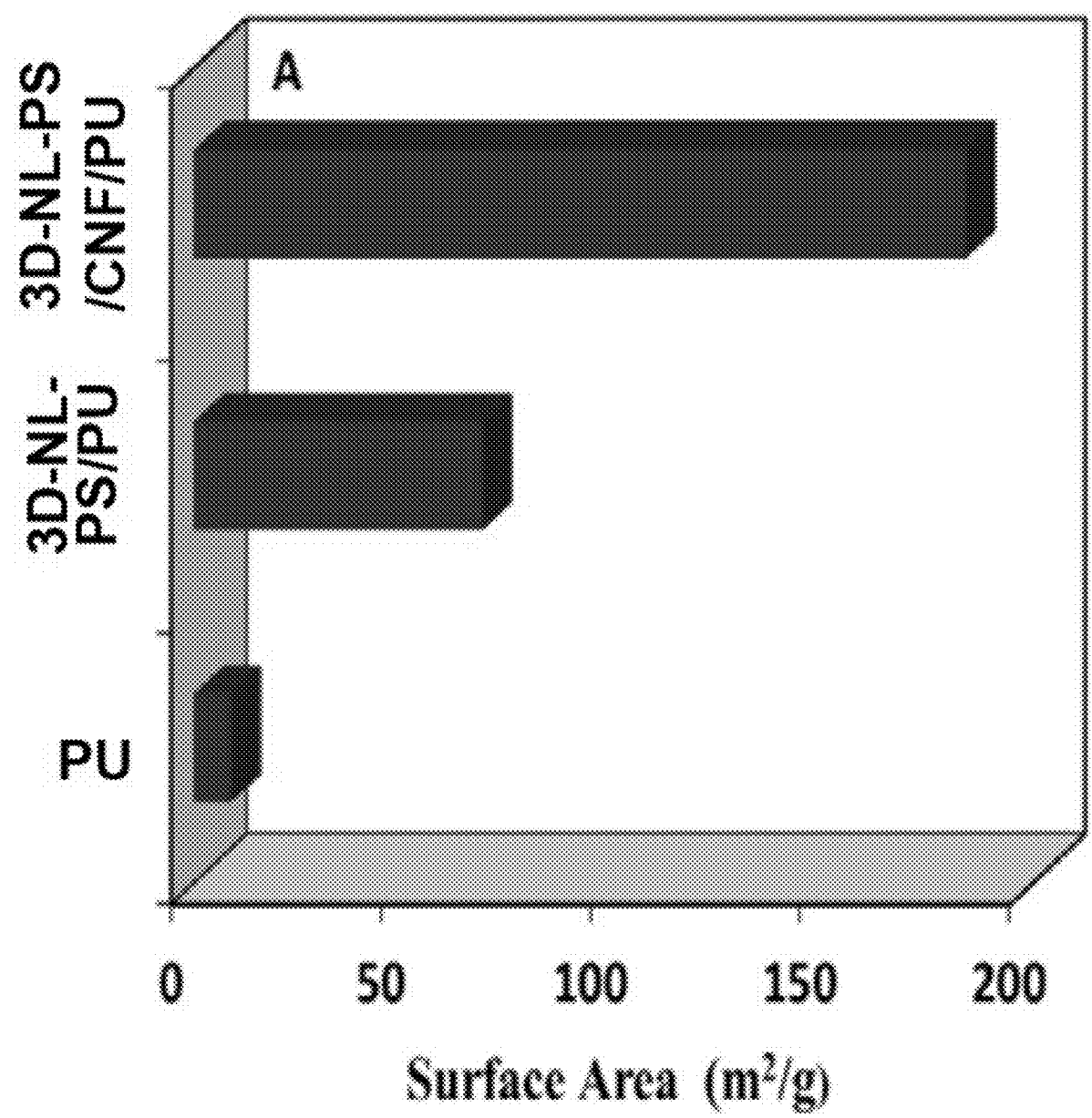
FIG. 4A shows BET surface area of PU, 3D-NL-PS/PU, and 3D-NL-PS/CNF/PU.

FIG. 4A shows that the surface area of the 3D-NL-PS/CNF/PU was found to be 184 m$^2$/g, such that inventive materials may have a surface area of at least 150, 160, 170, 175, 180, 182.5, 185, 187.5, 190, 192.5, 195, 197.5, 200, 205, 210, 215, or 220 m$^2$/g and/or up to 450, 400, 350, 325, 300, 275, 265, 250, 240, 233, 225, 215, 210, 205, or 200 m$^2$/g. The synergistic effect of polystyrene and the carbon nanofiber can not only improves the hydrophobicity, but also indicates a strong effect on the surface area.

Figure 4B:
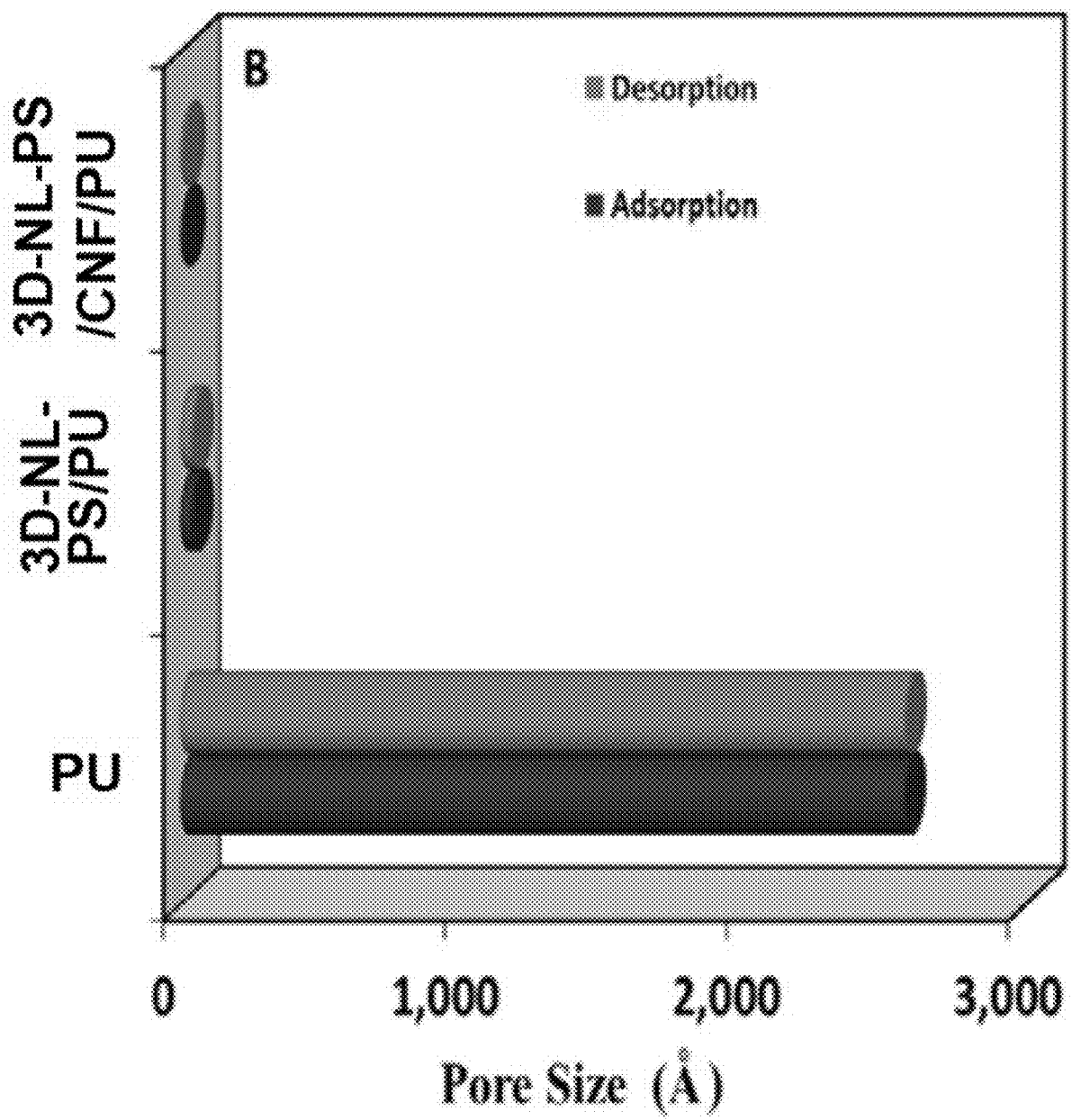
FIG. 4B shows BET pore size comparison of PU, 3D-NL-PS/PU, and 3D-NL-PS/CNF/PU.

FIG. 4B shows BET analysis of the samples, which indicates that polystyrene also can have an effect on the pore size. The pure PU sample shows an adsorption pore size of 2,567 Å (256.7 nm) and a desorption pore size of 2,569 Å (256.9 nm), i.e., the PU support may have an average BET pore size of at least 200, 205, 210, 215, 220, 225, 230, 235, 240, 245, 250, 255, 260, 265, 270, or 275 nm and/or up to 300, 290, 280, 275, 270, 265, 260, 255, or 250 nm. The formation of the 3D PS architecture by natural light exposure reduced the pore size of adsorption to 39.1 Å and desorption to 39.2 Å for 3D-NL-PS/PU, i.e., 3D-NL-PS/PU may have an average BET pore size of at least 25, 27.5, 30, 32.5, 33.3, 35, 37.5, 38, 39, or 40 Å, and/or up to 60, 57.5, 55, 52.5, 50, 47.5, 45, 42.5, 40, 39, or 38 Å. The pore size was further reduced to an adsorption pore size of 10.0 Å and a desorption pore size of 10.1 Å by combining PS and CNF support in 3D-NL-PS/CNF/PU as seen in FIG. 4B, i.e., inventive materials may have an average BET pore size of at least 5, 6, 6.67, 7, 7.25, 7.5, 7.75, 8, 8.25, 8.5, 8.75, 9, 9.25, 9.5, 9.75, 10, 10.1, 10.2, or 10.25 Å and/or up to 15, 14, 14.5, 14, 13.5, 13.25, 13, 12.75, 12.5, 12.25, 12, 11.75, 11.5, 11.25, 11, 10.75, 10.5, 10.25, 10.2, 10.1, or 10 Å. While not wishing to be bound by any theory, the sharp reduction in the pore size from pure PU to either polymerized material, 3D-NL-PS/PU or 3D-NL-PS/CNF/PU, may be due to branching of the PS on the CNF-grafted PU, which could provide numerous new small pores. The presence of many small hydrophobic pores in the porous network of the 3D-NL-CNF/PS/PU may thus increase surface area and refine separation of oils from water.

FIG. 5 presents a possible mechanism for the synthesis of 3D-NL-PS/CNF/PU, showing PS branches off of the carbon-nanostructure frame. The average branching of PS (and/or other monomers) in inventive materials may be at least 1 per 5, 10, 15, 20, 25, 50, 100, 150, 200, 250, or 500 monomers.

FIG. 6B shows an example of fitting the CNF-grafted PU support material into a sealable, glass reactor. Prior to fitting into the glass reactor, the CNF-grafted PU support material is preferably cured overnight at 60° C. The reactor, preferably glass or some transparent inert material, can be selected to ensure the natural sunlight radiation passes through the reactor and the fitted material is naturally irradiated. The reactor can be sealed with the monomer(s), e.g., styrene, in its base, such that the fitted CNF-grafted PU material is exposed to natural sunlight to obtain 3D-NL-PS/CNF/PU by solar irradiation. Although exposure of a reactor containing liquid styrene and the CNF-grafted PU material to natural sunlight can be suitable to polymerize styrene and/or other monomers, a properly tailored synthetic light source (e.g., at least 1, 5, 10, 25, 50, 75, 100, 125, 150, 175, or 200 nm and/or up to 500, 450, 400, 375, 350, 325, 300, 275, 250, 225, 200, 150, 100, or 50 nm) may be likewise employed to supplement or supplant the solar irradiation.

FIG. 6A shows CNF-grafted PU, while FIG. 6B shows CNF-grafted PU fitted into a pyrex glass reactor prior to styrene polymerization.

Figure 7A:
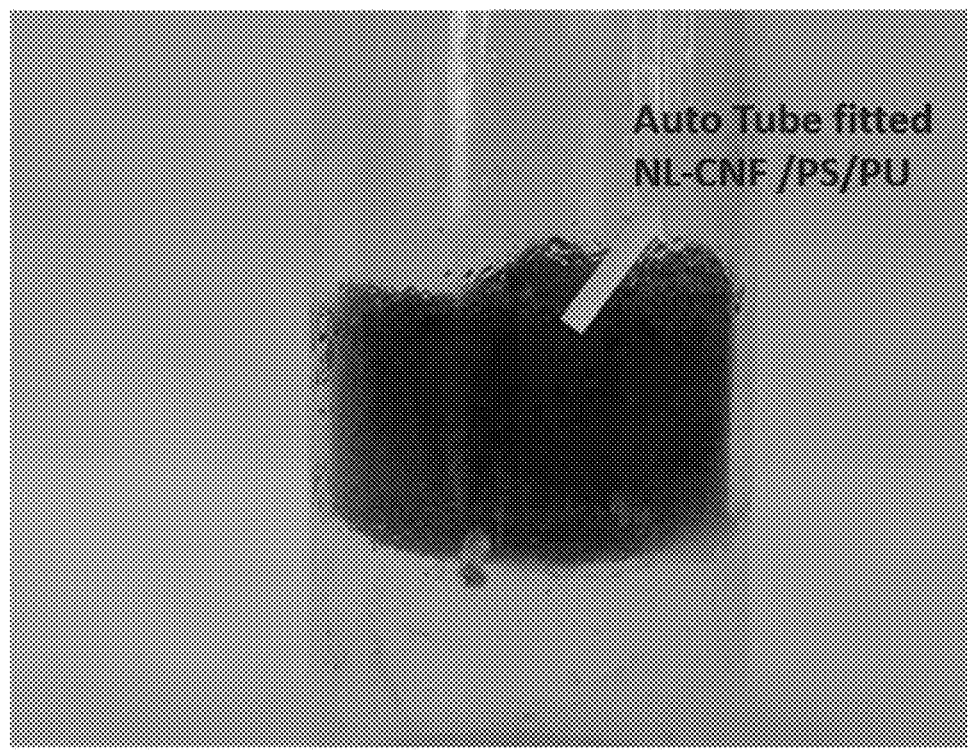
FIG. 7A shows auto tube fitted with an inventive sample of 3D-NL-PS/CNF/PU material.
Figure 7B:
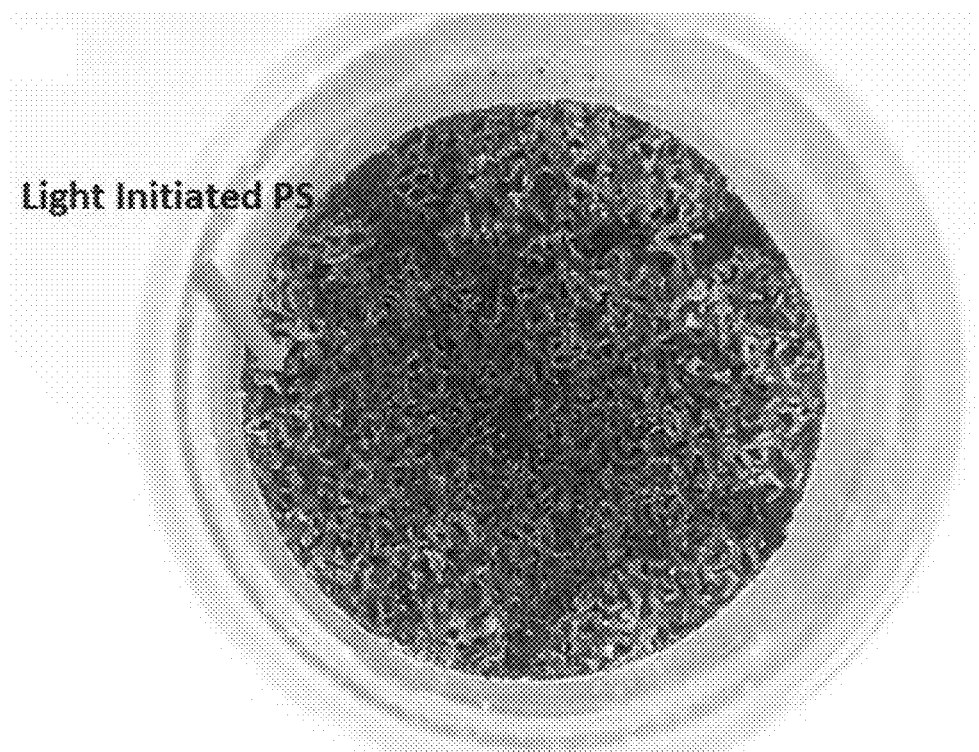
FIG. 7B shows a top plan view of the auto tube fitted 3D-NL-PS/CNF/PU from FIG. 7A; C) water contact angle and, (D) fast absorption of hexane by 3D-NL-PS/CNF/PU.

FIG. 7A shows a sample of auto fixed 3-D-NL-PS/CNF-grafted PU. The growth of the PS can be seen in the CNF-grafted PU from the upper view of the tube in FIG. 7B. PS and/or other radically polymerized monomer(s) can add another positive feature to the CNF-grafted PU, in that, prior to polymerization, the CNF-grafted PU support is soft and easily compressible. Polystyrene or other polymers can impart stiffness and fine tubular channels into the 3D porous PS-CNF-grafted PU.

Figure 7C:
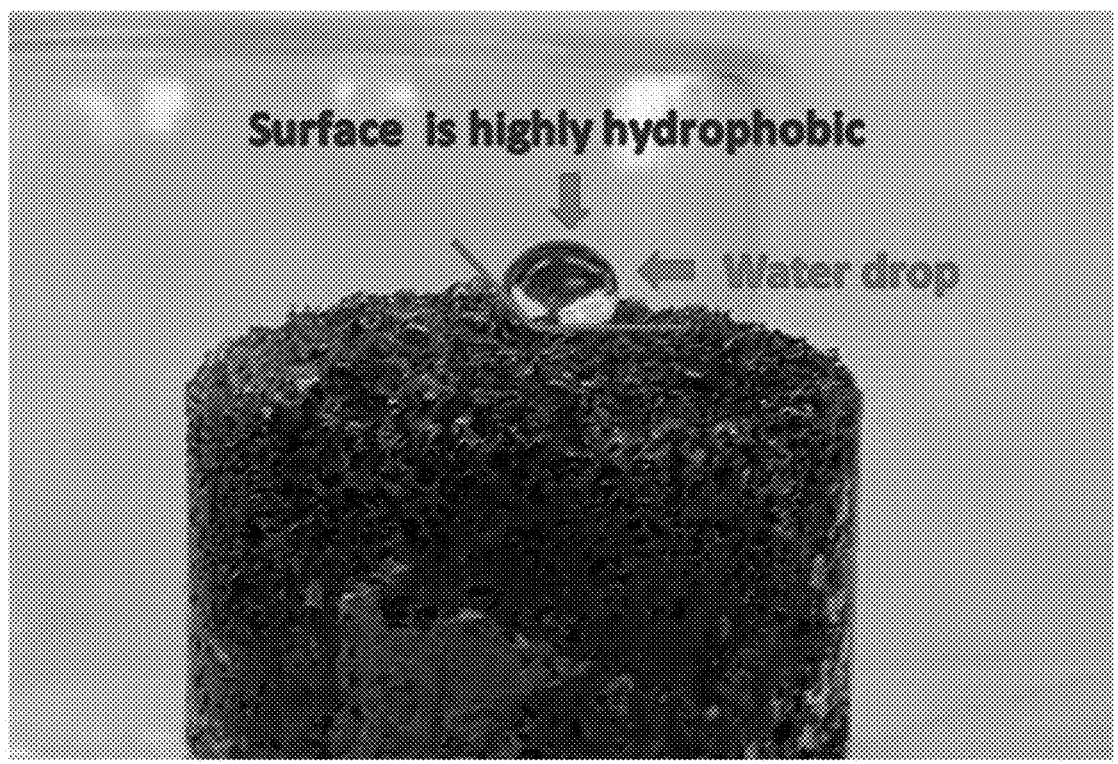
FIG. 7C shows an upper perspective view of the auto tube fitted 3D-NL-PS/CNF/PU from FIG. 7A showing the water contact angle.
Figure 7D:
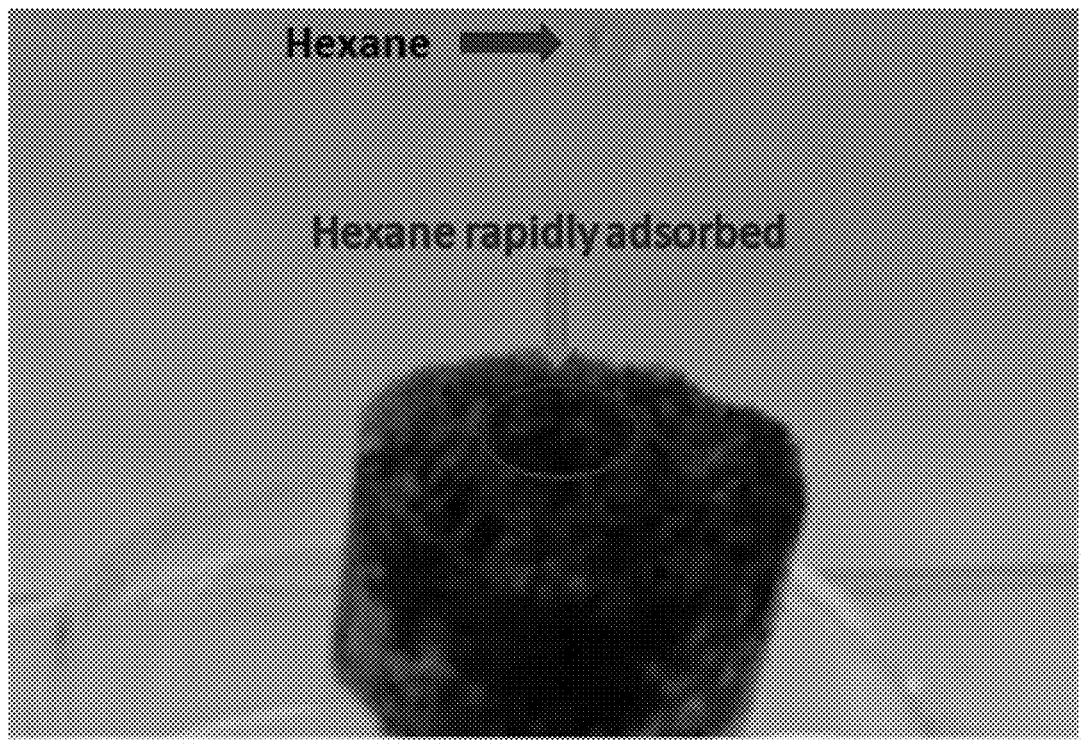
FIG. 7D shows exemplary fast absorption of hexane by 3D-NL-PS/CNF/PU according to the invention from an upper perspective view.

FIG. 7C shows the contact angle of water with a sample 3D-NL-PS/CNF/PU material. The surface of 3D-NL-PS/CNF/PU materials can display superhydrophobic behavior with very high water contact angle, as seen in FIG. 7C. The contact angle of water with the 3D-NL-PS/CNF/PU sample in FIG. 7C was found to be approximately 148±3°, i.e., at least 129, 132, 135, 138, 141, 144, 147, 150, 153, 156, or 159° and/or up to 171, 168, 165, 162, 159, 156, 153, 150, or 147°. For reference, the contact angle of water on pure PU is 96±4° and the contact angle of water on 3D-NL-PS/PU (without CNF) is roughly 126±4°. The water contact angle increase on 3D-NL-PS/CNF/PU indicates that CNF-grafting onto PU can play a role in improving the contact angle of water on inventive materials. Compared to water, hexane can be rapidly adsorbed by the 3D-NL-PS/CNF/PU surface, demonstrating the superoleophilicity of the 3D-NL-PS/CNF/PU, as seen in FIG. 7D.

Figure 8B:
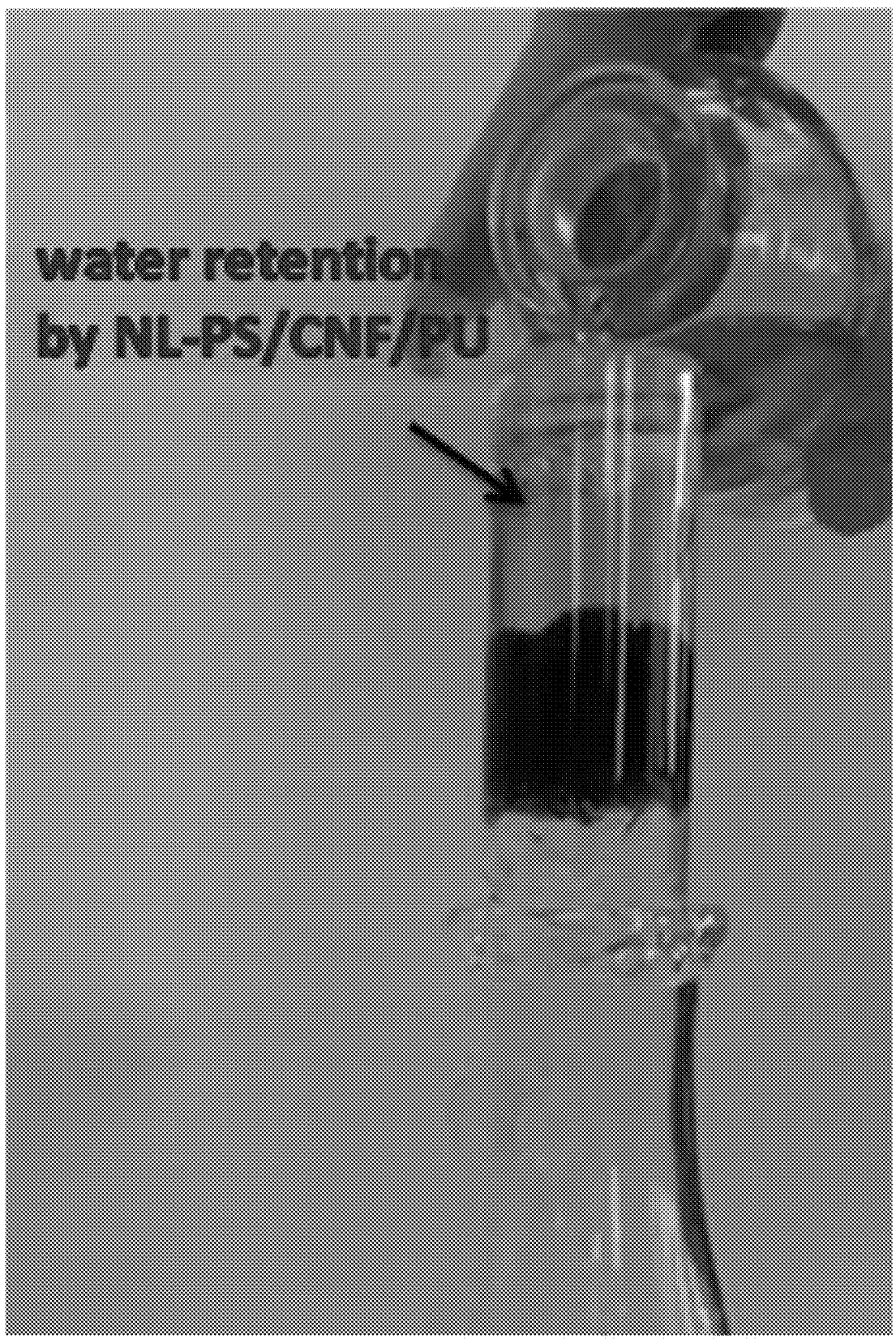
FIG. 8B shows a separation of hexane and methylene blue colored water passing through the 3D-NL-PS/CNF/PU plug in FIG. 8A, with the methylene blue colored water being retaining by 3D-NL-PS/CNF/PU plug.

FIG. 8A shows a glass tube fitted with 3D-NL-PS/CNF/PU material filled into an opening of a titration flask. Clearly, the inventors contemplate powders of 3D-NL-PS/CNF/PU material filled into fritted glass filters and or columns, or into glassware affixable to standard ground glass jointed glassware, as well as any suitable containers, firkins, kilderkins, barrels, hogsheads, pipes, tuns, drums, rigid or flexible IBC tanks (IBC tote, IBC tank, IBC, pallet tanks, etc.), cargobeamer, tank container (tanktainer), or other standardized units, e.g., carried in ocean-bound vessels or other watercraft. FIG. 8B shows a fast passage of hexane, with restricted water passage, through a plug or barrier of 3D-NL-PS/CNF/PU. Methylene blue color was added to water along with colorless hexane in a glass bottle, and this fluid mixture was passed through a glass tube fitted with 3D-NL-PS/CNF/PU material (plug) in the opening of a titration flask in FIGS. 8A and B.

Numerous modifications and variations of the present invention are possible in light of the above teachings. It is therefore to be understood that within the scope of the appended claims, the invention may be practiced otherwise than as specifically described herein.

The invention claimed is:

1. A three dimensional porous network composite, comprising:
    a substrate comprising a polyurethane;
    carbon nanostructures directly contacting the substrate;
    branches comprising a radically polymerized monomer, wherein the branches are covalently bonded to the carbon nanostructures.

2. The composite of claim 1, having a surface area in a range of from 100 to 300 $m^2/g$ and a pore size in a range of from 5 to 25 Å.

3. The composite of claim 1, having a water contact angle in a range of from 130 to 160°.

4. The composite of claim 1, wherein the substrate comprises at least 90 wt. %, based on a total substrate weight, of polyurethane.

5. The composite of claim 1, wherein the polyurethane has a specific surface area in a range of from 7.5 to 12.5 $m^2/g$.

6. The composite of claim 1, wherein the carbon nanostructures comprise at least 50 wt. %, based on total nanostructure weight, of carbon nanofibers.

7. The composite of claim 1, wherein the radically polymerized monomer comprises an olefin, a styrene, a (meth)acrylate, a vinyl compound, or a mixture of these.

8. The composite of claim 1, wherein the radically polymerized monomer comprises a styrene.

9. The composite of claim 1, wherein the radically polymerized monomer comprises at least 85 wt. %, based on total monomer weight, of a styrene.

10. The composite of claim 9, wherein the styrene is unsubstituted styrene.

11. The composite of claim 1, having ridges, visible by SEM, with average heights in a range of from 0.5 to 5 µm.

12. The composite of claim 1, wherein the branches have an average length of at least 1.25 nm and an $M_n$ of at least 520.

13. A filter, comprising the composite of claim 1.

14. A method of fabricating a three dimensional porous network composite, the method comprising:
    vapor phase polymerizing a radically polymerizable monomer onto a surface of a polyurethane substrate hosting carbon nanostructures, in a reactor while irradiating with at least one of UV light and visible light,
    wherein the polymerizing occurs on the surface of the carbon nanostructure.

15. The method of claim 14, wherein the reactor is at least one of a sealed reactor and a glass reactor, and
    the at least one of the UV light and the visible light is at least partially provided by sunlight.

16. The method of claim 14, wherein the monomer comprises styrene
    and the carbon nanostructures comprise carbon nanofibers.

17. The method of claim 14, further comprising:
    contacting the polyurethane substrate with a suspension of the carbon nanostructures in an organic solvent to form a surface modified polyurethane directly contacting the carbon nanostructures.

18. A method of purifying contaminated water, the method comprising:
    contacting contaminated water comprising a hydrophobic organic fluid with a layer of a thickness in a range of from 1 to 5 cm comprising the composite of claim 1,
    wherein at least 90 wt. % of the water does not pass through the layer, and
    wherein at least 90 wt. % of the organic fluid passes through the layer.

19. The method of claim 18, wherein the organic fluid comprises a fraction of crude oil.

* * * * *